United States Patent [19]

Hill et al.

[11] Patent Number: 5,509,886

[45] Date of Patent: Apr. 23, 1996

[54] CARD PACKAGE PRODUCTION SYSTEM WITH MODULAR CARRIER FOLDING APPARATUS FOR MULTIPLE FORMS

[75] Inventors: Gregory S. Hill, Lake Zurich; Jeffrey L. Hill, Mundelein, both of Ill.; Robert J. Bretl, Menominee, Mich.

[73] Assignee: Dynetics Engineering Corporation, Lincolnshire, Ill.

[21] Appl. No.: 36,439

[22] Filed: Mar. 24, 1993

Related U.S. Application Data

[63] Continuation-in-part of Ser. No. 19,865, Feb. 19, 1993, abandoned.

[51] Int. Cl.$^6$ .................... B65H 45/14; B65H 45/20; B65H 45/04
[52] U.S. Cl. .................................................... 493/419
[58] Field of Search .................... 493/416, 417, 493/419, 420, 421, 422, 436, 437, 438, 446, 405

[56] References Cited

U.S. PATENT DOCUMENTS

| | | | |
|---|---|---|---|
| 3,097,578 | 7/1963 | Winkler et al. | 493/419 |
| 4,034,210 | 7/1977 | Hill et al. | 235/61.12 N |
| 4,194,685 | 3/1980 | Hill et al. | 235/375 |
| 4,384,196 | 5/1983 | McCumber et al. | 235/375 |
| 4,429,217 | 1/1984 | Hill et al. | 235/380 |
| 4,432,745 | 2/1984 | Eldridge | 493/419 |
| 4,585,219 | 4/1986 | Lehmann et al. | 493/419 |
| 4,944,131 | 7/1990 | Gough | 493/420 |
| 4,985,013 | 1/1991 | Van der Werff et al. | 493/437 |
| 5,129,876 | 7/1992 | Brabant et al. | 493/419 |
| 5,183,246 | 2/1993 | Edwards et al. | 493/420 |
| 5,352,177 | 10/1994 | Walter | 493/420 |

Primary Examiner—Jack W. Lavinder
Assistant Examiner—Christopher W. Day
Attorney, Agent, or Firm—Potthast & Ring

[57] ABSTRACT

A card package production system (20) for producing card packages (22) with cards (26) mounted to bifold carrier forms (24) with a pair of parallel, spaced, preweakened fold lines (33) and (34) dividing the body (32) of the carrier forms into leading end (35), middle (36) and lagging end (37) sections, a card carrier form folding apparatus (30) having a stop member (46) located extending downwardly into a blocking position along a folding path (44), a plurality of rollers (38)(39) and (40) for moving the carrier forms (24) along the folding path (44) and into the stop member (46) to buckle the leading end (35) and middle section (36) away from the folding path (44), a pushing member (56) driven by an electric motor (57) engaging the lagging end section (37) to push the carrier form (24) along the folding path (44) to pivotally swing the stop member (46) to a nonblocking position enabling the middle section (36) to fall back against the lagging section (37) folding the carrier (24) along fold lines (33) and (34) a transporting pushing pin member (74) interconnected with a circulating chain linkage (76) extending through a slot opening (242) in the folding path (44) to turn the folded carrier (24) about a pivot pin (220) for ejectment to a folded carrier outlet station (240).

27 Claims, 20 Drawing Sheets

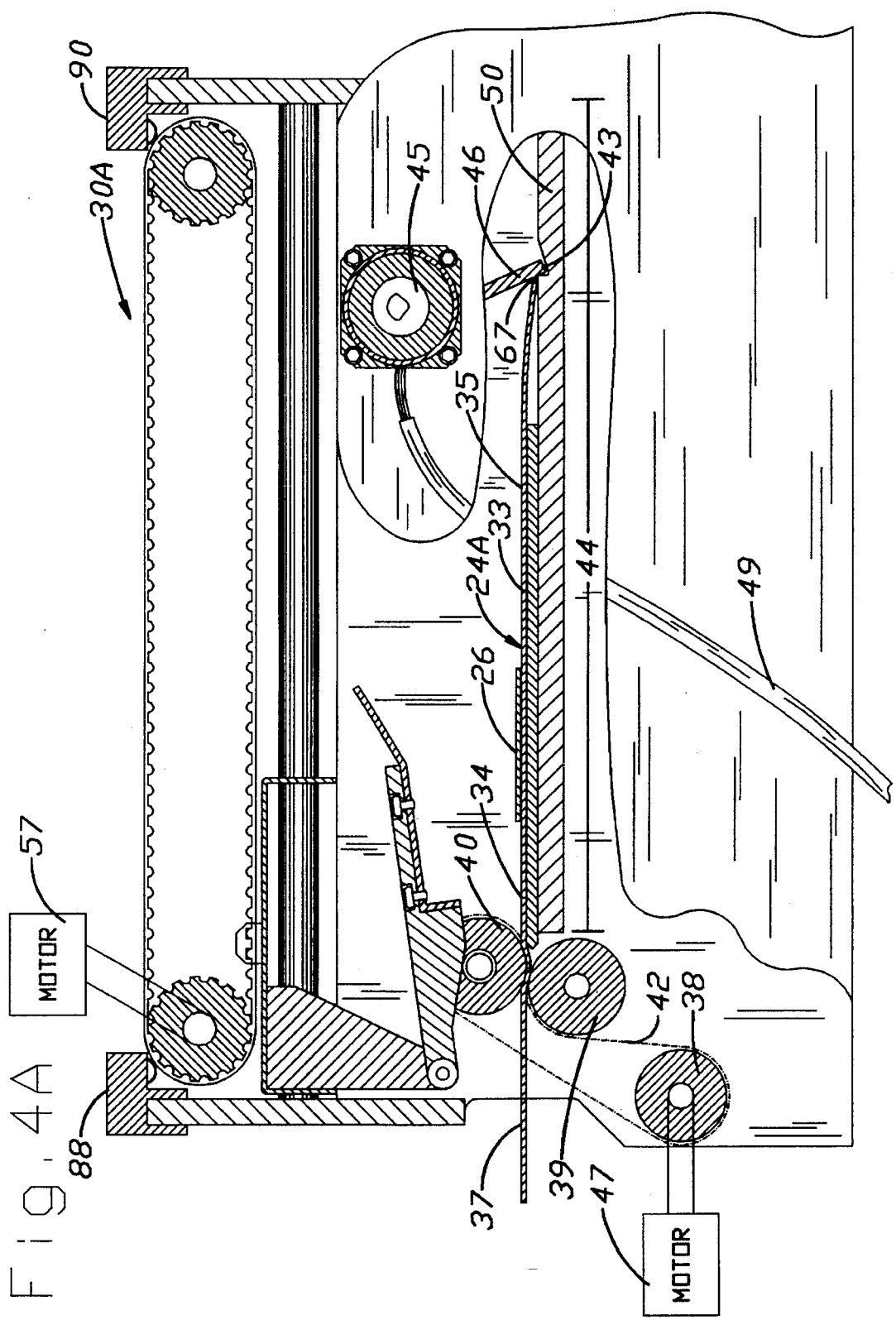

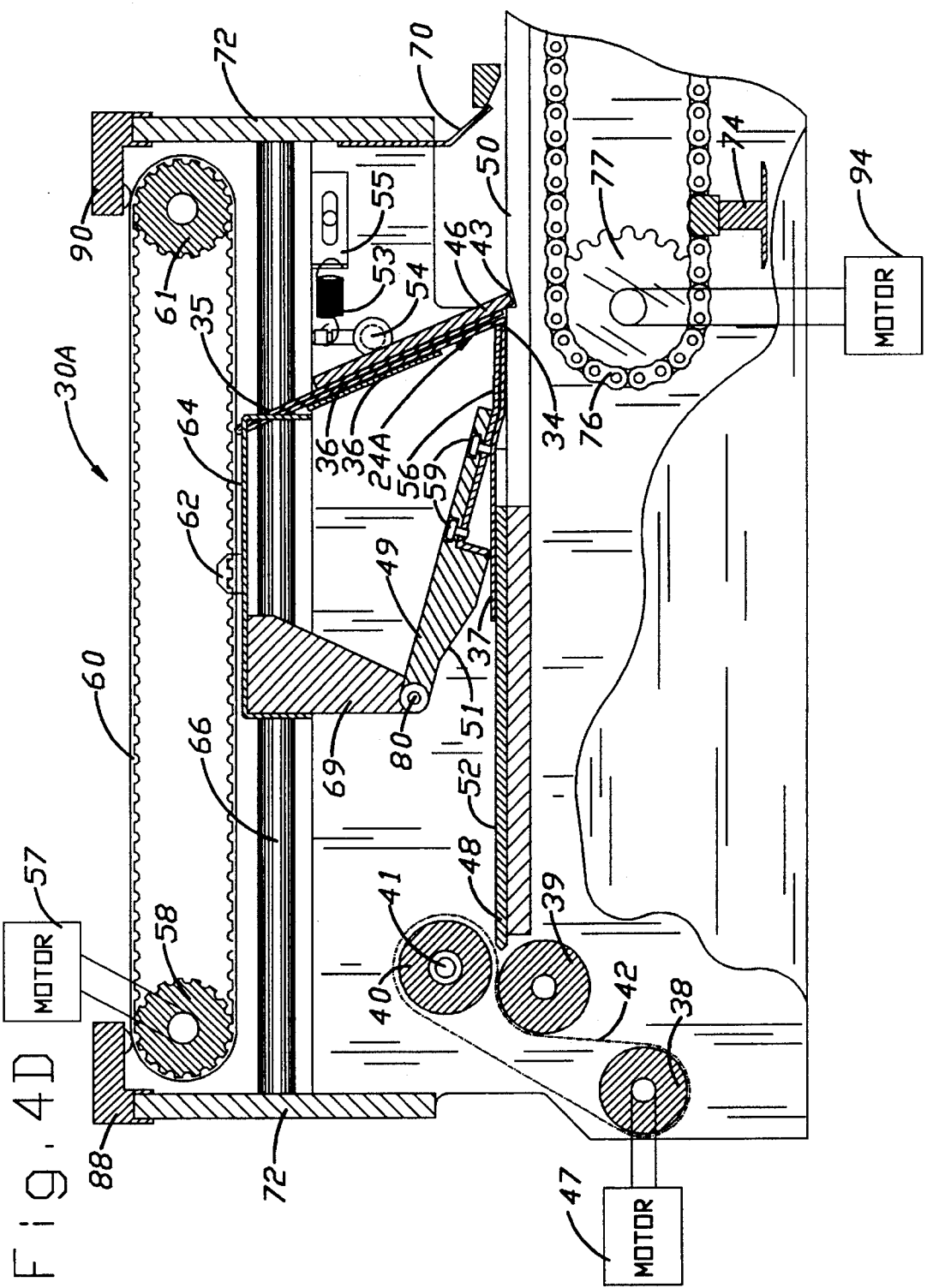

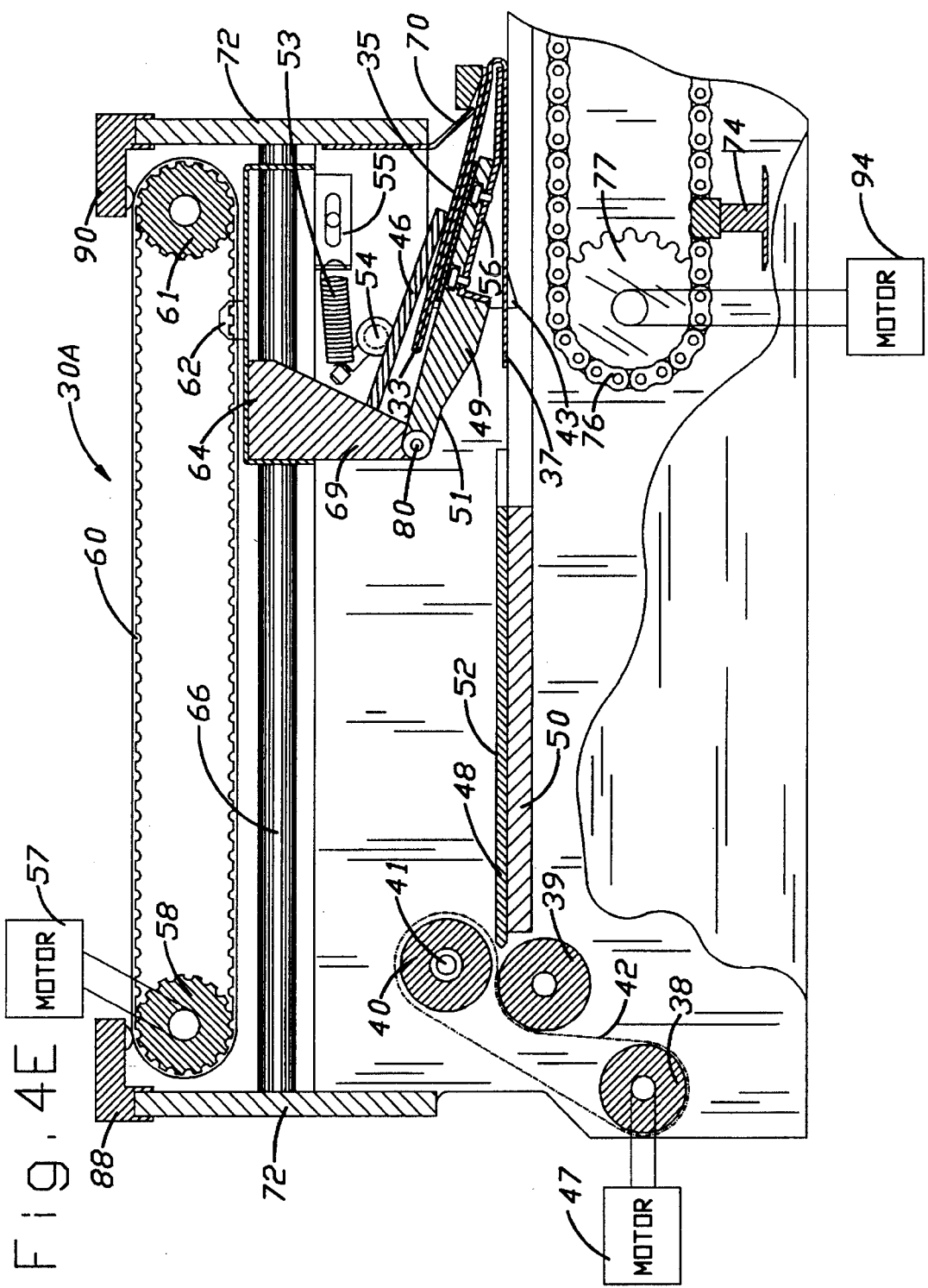

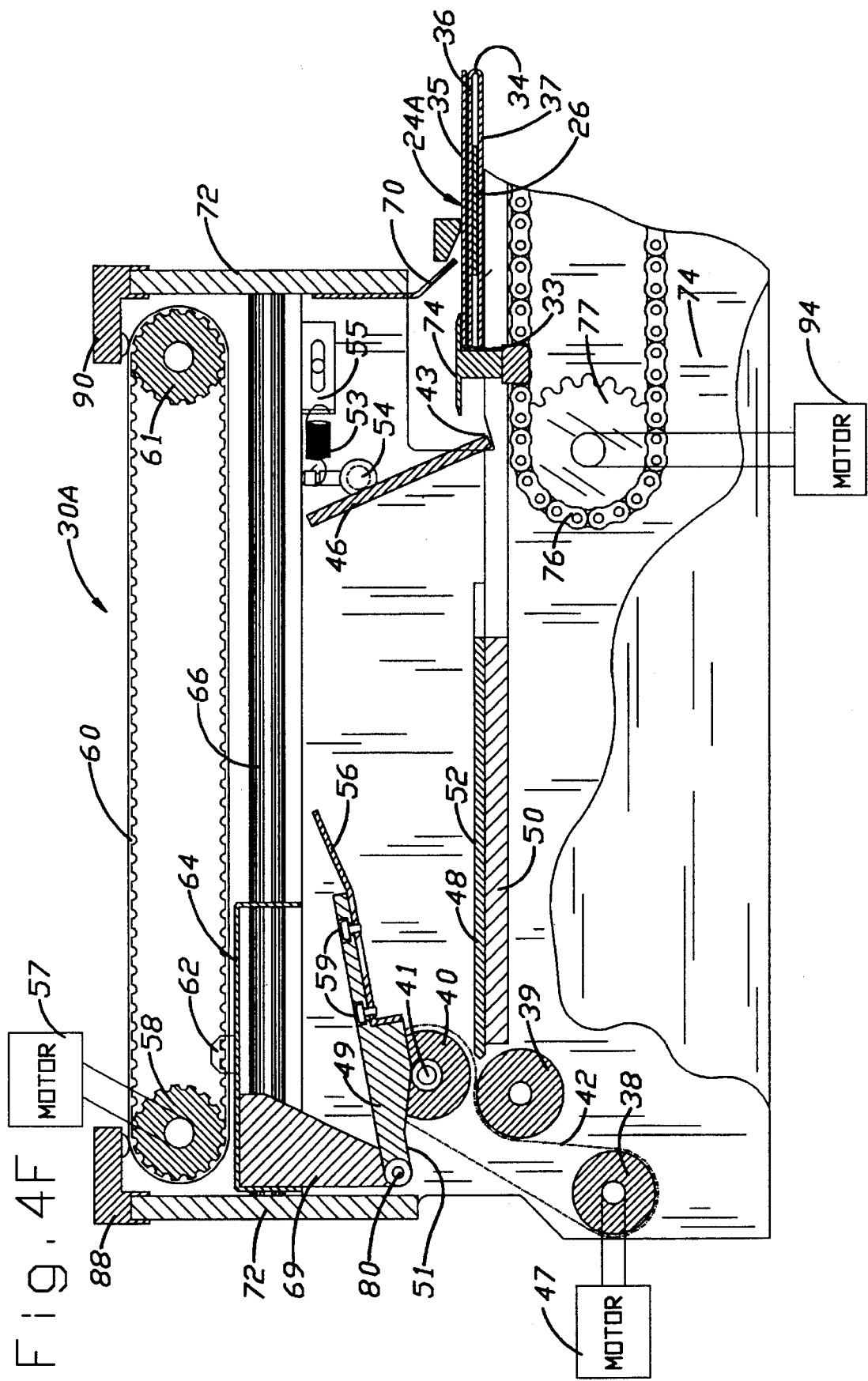

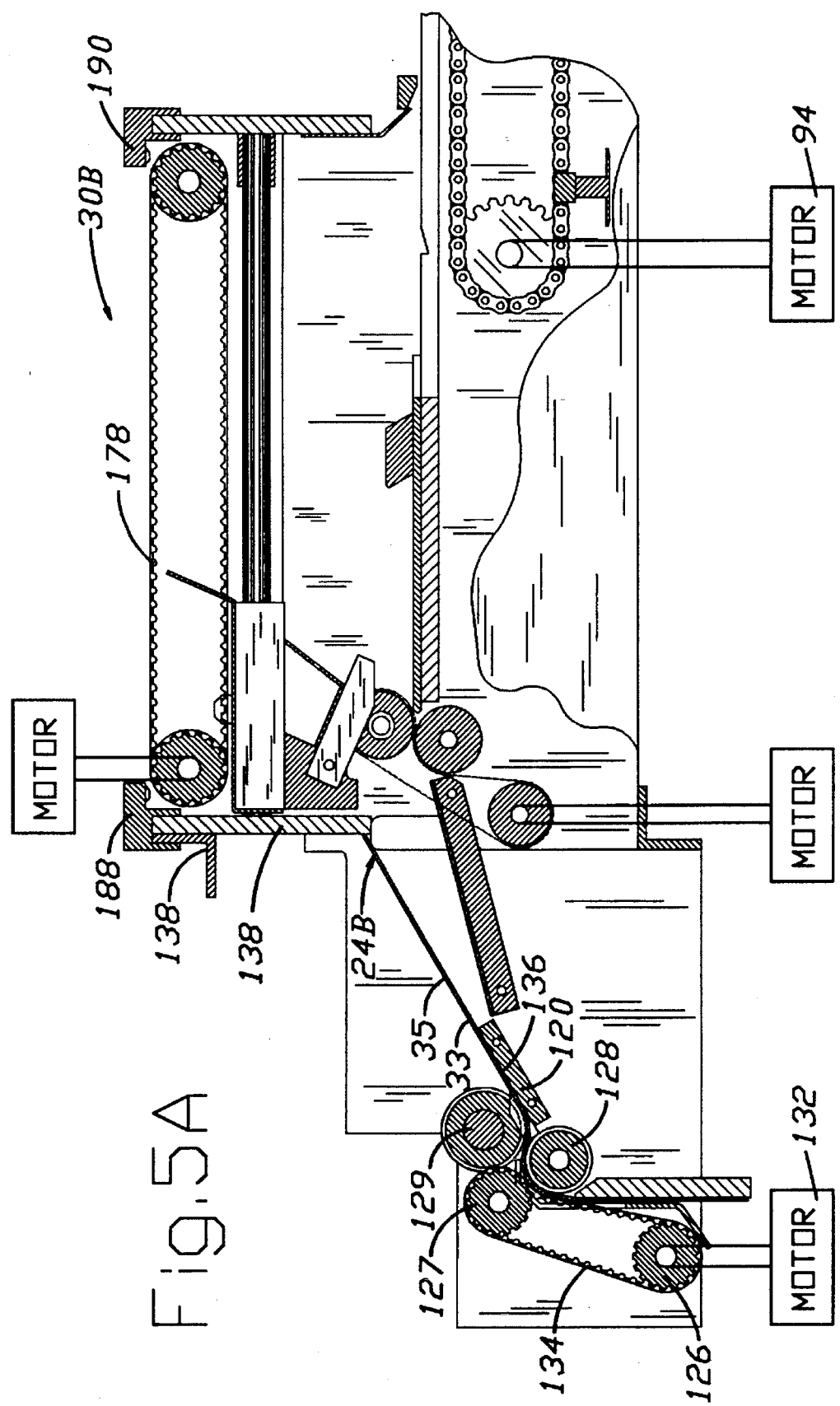

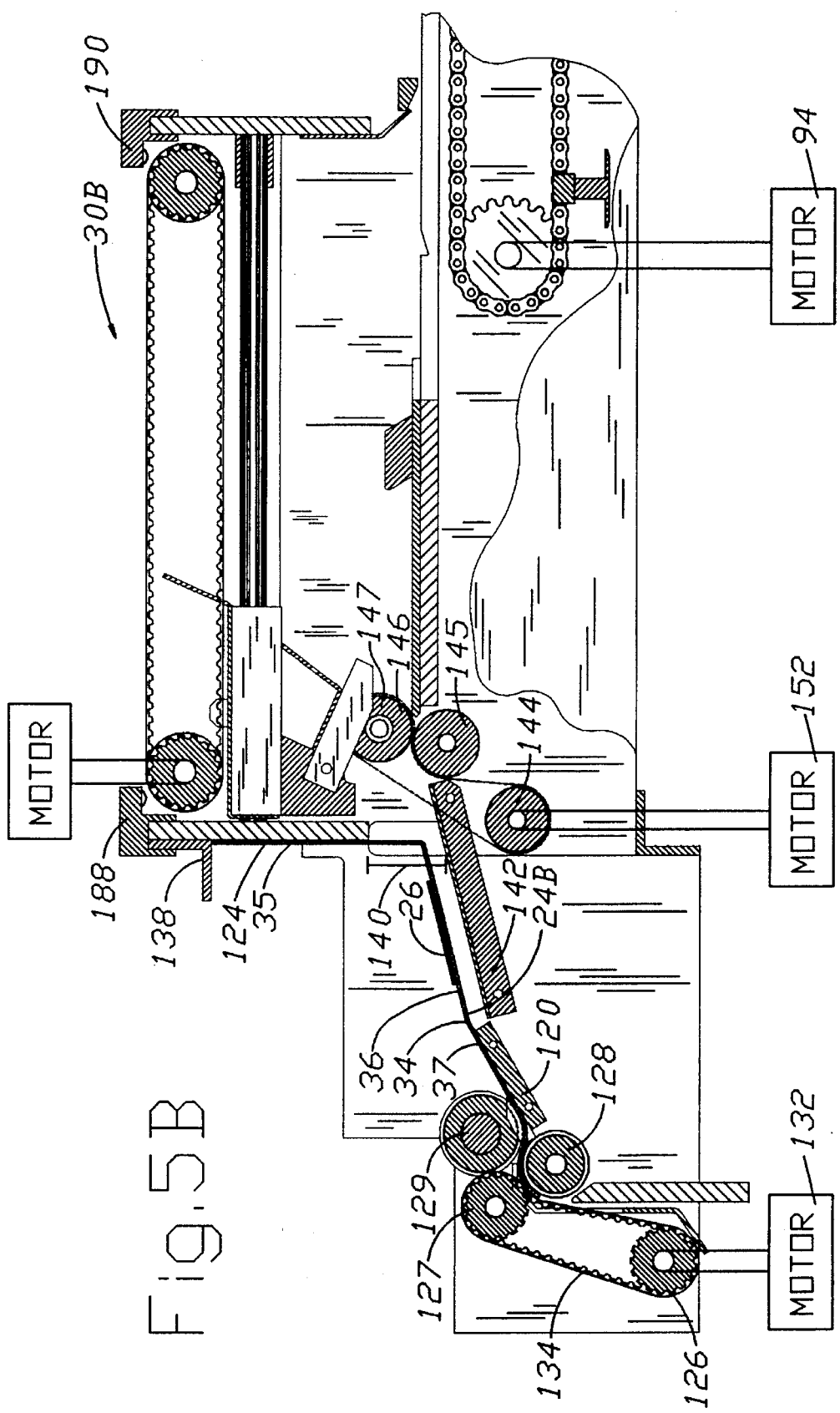

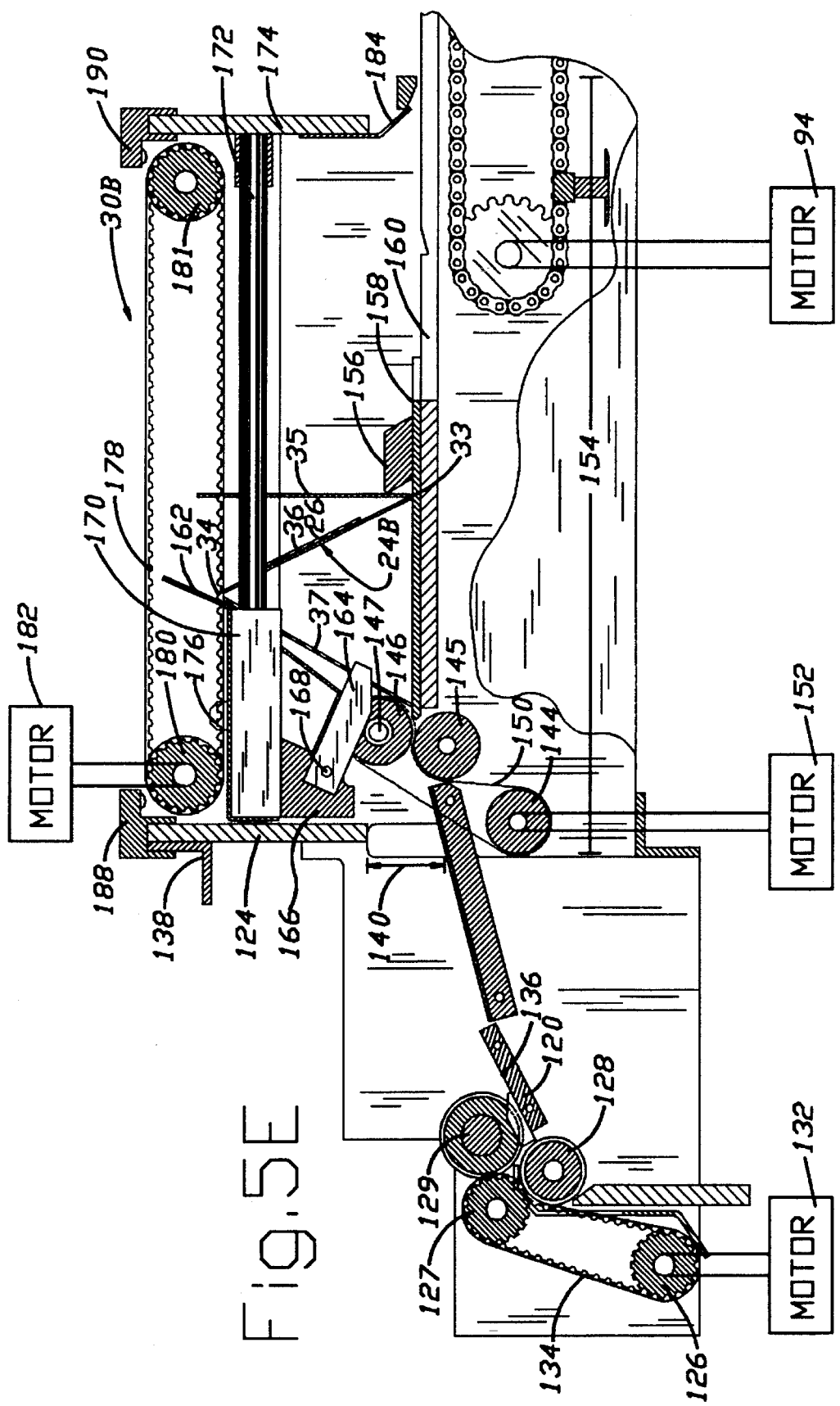

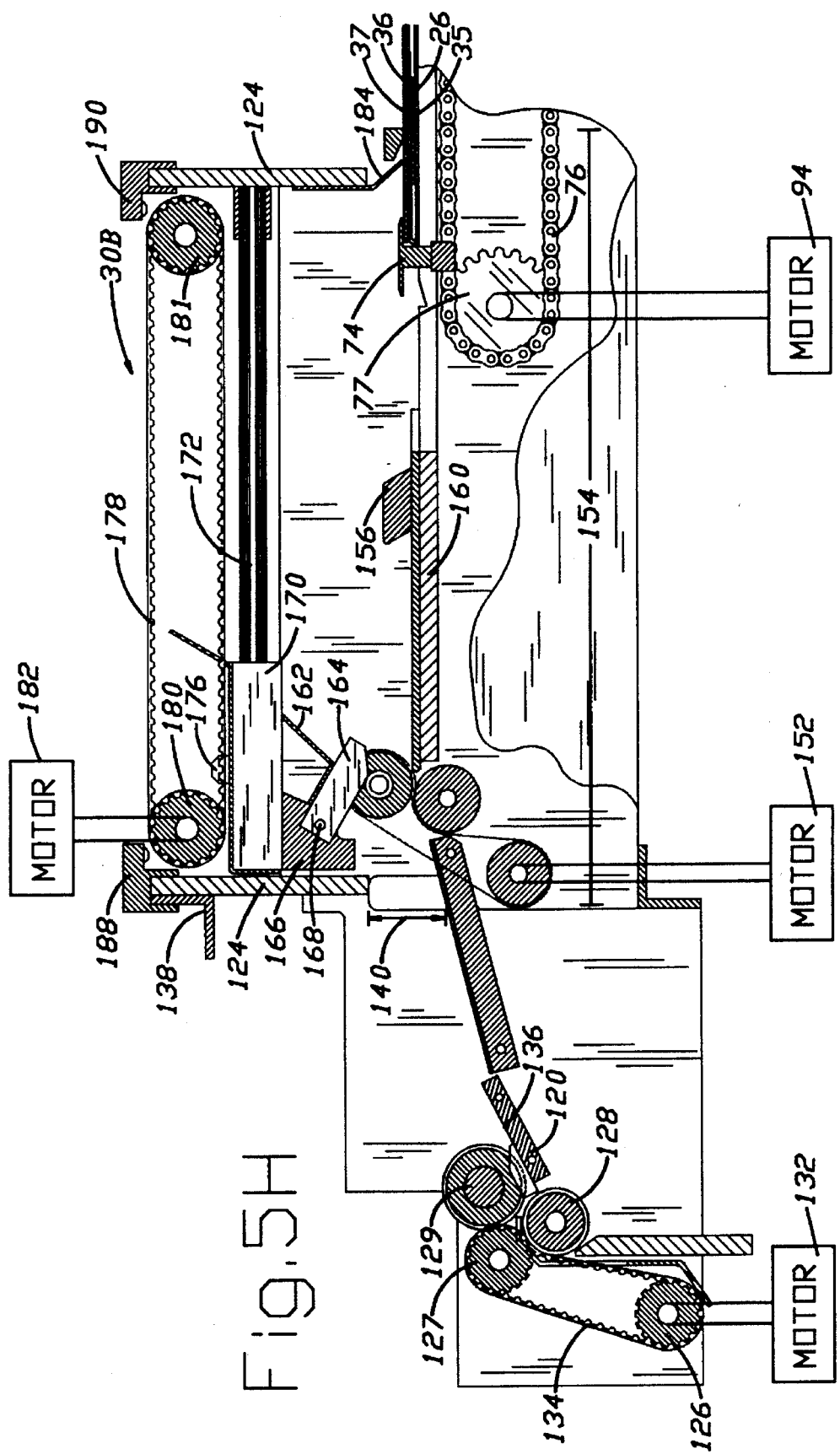

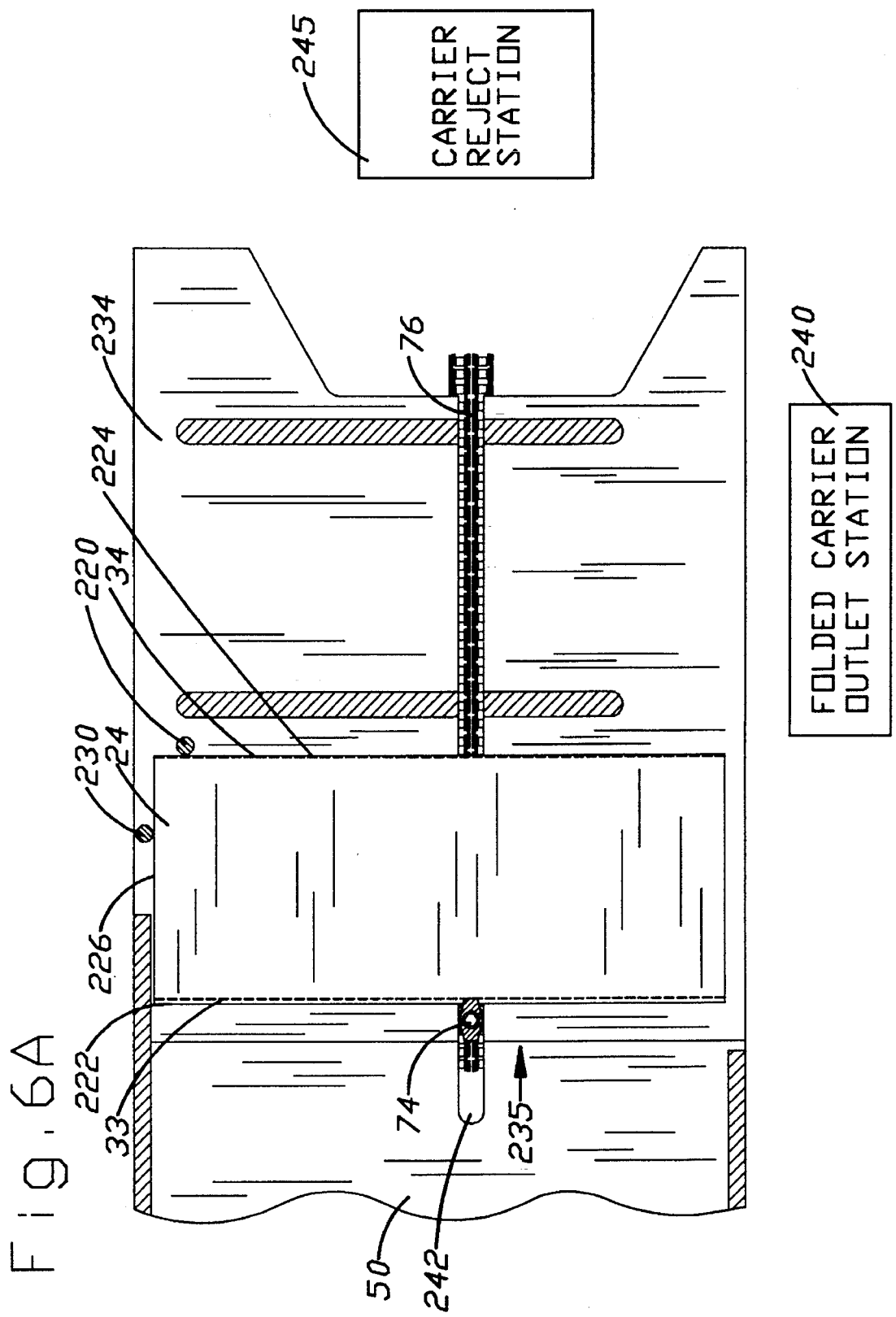

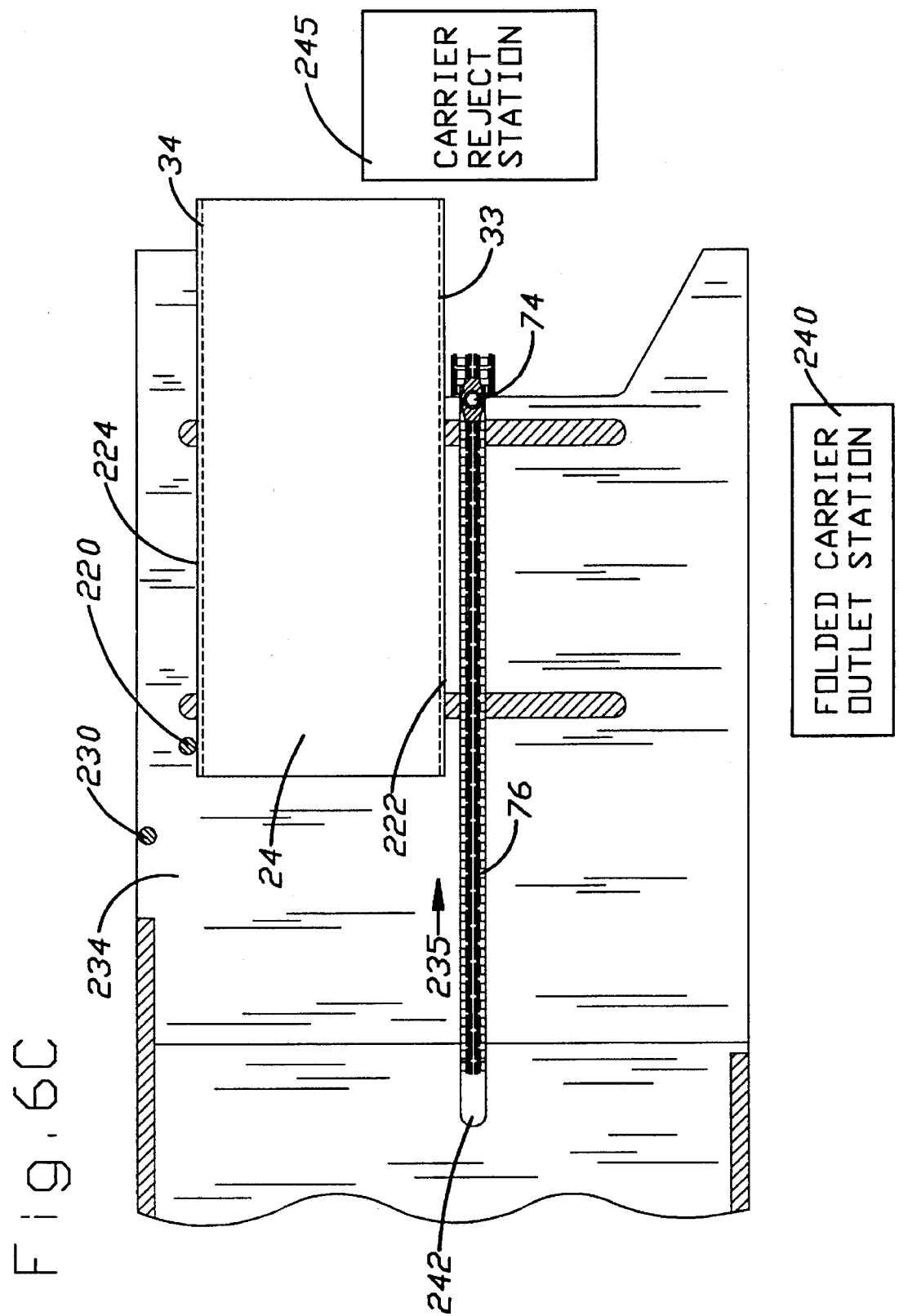

5,509,886

CARD PACKAGE PRODUCTION SYSTEM WITH MODULAR CARRIER FOLDING APPARATUS FOR MULTIPLE FORMS

CROSS-REFERENCES TO RELATED APPLICATION

This application is a continuation-in-part of U.S. patent application Ser. No. 08/019,865 entitled "Automatic Embossed Card Package Production Apparatus and Methods" of Hill et al. filed Feb. 19, 1993, now abandoned.

BACKGROUND OF THE INVENTION

1. Field of the Invention

This invention generally relates to a card package production system with a card carrier folding apparatus.

2. Description of the Related Art Including Information Disclosed Under 37 CFR 1.97–1.99

Card package production systems such as shown in U.S. Pat. No. 4,384,196 issued May 17, 1983 to McCumber et al. entitled "Apparatus and System for Preparing Data Cards and Mailer Forms and for Attaching Data Cards to Respectively Associated Mailer Forms"; No. B1 4,034,210 issued Jul. 5, 1977 to Hill et al. entitled "Credit Card Carriers and Methods of Manufacture"; U.S. Pat. No. 4,194,685 issued Mar. 25, 1980 to Hill et al. entitled "Verifying Insertion System Apparatus and Method of Operation" and U.S. Pat. No. 4,429,217 issued Jan. 31, 1984 to Hill et al. entitled "Verifying Insertion System and Apparatus".

In known systems different types of carrier forms are used in which the cards are wedge trapped between fold lines of a bifold carrier having leading end, middle and lagging end sections. However, neither of these systems fold carriers other than those which wedge trap one or two edges of a card by folding the end sections over the middle section when the cards are mounted. Moreover, in McCumber et al., because of the cards that form corner pockets for receipt of the card are diagonal oscillating fingers were required to open the pockets to enable receipt of the carriers therein.

Moreover, none of the known card package production systems were capable of folding different types of carriers in different ways but rather were limited to a single type of carrier and a single type of folding mechanism which precludes the use of different types of carriers.

SUMMARY OF THE INVENTION

It is therefore the principal object of the present invention to provide a card package production system with card carrier folding apparatus for multiple types of carriers which overcomes the disadvantages of folders in known systems and provides a simple and effective means for automatically folding unique carrier forms.

This object is achieved by provision of a card package production system for producing card packages with cards mounted to a bifold carrier form with a body and a pair of parallel, spaced, preweakened fold lines dividing the body into leading end, middle and lagging end sections with a card carrier form folding apparatus, comprising means for defining a folding path, a stop member in the folding path and means for moving the carrier form along the folding path and into the stop member to buckle the leading end section and middle section away from the folding path along the fold line therebetween.

Also, the object of the invention is partly obtained by providing a card package production system for producing card packages with cards mounted to a bifold carrier form with a body and a pair of parallel, spaced, preweakened fold lines dividing the body into leading end, middle and lagging end sections with a card carrier form folding apparatus, comprising means for defining a folding path, means for pushing a carrier along the folding path, means for moving a carrier to a first folding position in which both fold lines are on one side of the pushing means, a folding fixture at a second folding position along the folding path through which carrier forms are moved to be folded and means responsive to movement of the carrier form to the first folding position to actuate the carrier pushing means to push the carrier form along the folding path and through the folding fixture to fold the form.

Obtainment of the object is additionally achieved by provision of a card package production system for producing card packages with cards mounted to a bifold carrier form with a body and a pair of parallel spaced preweakened fold lines dividing the body into leading end, middle and lagging end sections with a card carrier form folding apparatus, comprising means for releasably holding the leading end section against movement along the folding path, means for moving the lagging end section toward the leading end section while a leading edge of the leading end is releasably held against movement to fold the carrier form and means for actuating the releasable holding means to release the leading end section for movement after the form is partly folded to enable completion of folding of the carrier form.

Moreover, the object of the present invention is achieved by providing a card package production system for producing card packages with cards mounted to a bifold carrier form with a body and a pair of parallel spaced preweakened fold lines dividing the body into leading end, middle and lagging end sections with a card carrier form folding apparatus, comprising means for supporting the body of the carrier form while moving in a first direction, means for defining a folding gap, means for guiding the leading end section to move in a second direction until the fold line between the leading end section and the middle section is aligned with the folding gap and means for moving the middle section and the leading end section adjacent the fold line through the folding gap to fold together the leading end section and the middle section along the fold line therebetween as they pass through the gap.

The object of the invention is further obtained by providing a card package production system for producing card packages with cards mounted to a bifold carrier form with a planar body having opposite sides and a pair of parallel, spaced, preweakened fold lines dividing the body into leading end, middle and lagging end sections with a card carrier form folding apparatus, comprising means for defining a folding path, means for folding the end section over one side of the middle section along the fold line therebetween, means in the folding path for blocking movement of the folded leading end section and middle section adjacent the fold line therebetween along the path and means for moving the lagging end section toward the blocking member to buckle the lagging end section and middle section of the folding path and fold the lagging end section toward folded engagement with another side of the middle section opposite the one side of the middle section along the fold line therebetween.

Still further, the object of the invention is acquired in part by provision of a card package production system for producing card packages with cards mounted to a bifold carrier form with a body and a pair of parallel, spaced, preweakened fold lines dividing the body into leading end, middle and lagging end sections with a card carrier form folding apparatus, comprising means for folding the form about said fold lines with the leading end section facing in one direction and means for flipping the folded carrier form to a position with the leading end section facing in another direction opposite to the one direction.

Yet further, the object of the invention is achieved by providing a card package production system for producing card packages with cards mounted to a bifold carrier form with a planar body and a pair of parallel, spaced, preweakened fold lines dividing the body into leading end, middle and lagging end sections with a card carrier form folding apparatus, comprising means for folding the carrier, means for transporting the folded carrier with a preselected orientation in a preselected direction parallel to the planar body to a folded carrier outlet station and means for turning the folded carrier in the plane of the planar body from the orientation relative to the preselected direction to another different preselected orientation.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIG. 4A is a side view of a preferred embodiment of the folding mechanism employed to fold the carriers of FIGS. 2A and 2B in the card package production system of FIG. 1 with the pusher in a home position;

FIG. 4D is another side view of the folding mechanism of FIG. 4C during a later step in the folding sequence in which the pusher has begun pushing the carrier beneath a pivotal stop member;

FIG. 4E is another side view of the folding mechanism of FIG. 4D during a still alter step in the folding sequence in which the pusher has pushed the carrier form partially through a folding gap;

FIG. 4F is still another side view of the folding mechanism of FIG. 4E during a further step in the folding sequence in which the pusher has returned to the home position and a pushing member of the carrier turning mechanism begins pushing the folded carrier through the folding gap;

FIG. 5A is a side view of the preferred embodiment of the folding mechanism employed in the card package production system of FIG. 1 to fold the carrier forms of FIGS. 3A and 3B during an initial step in the folding sequence;

FIG. 5B is a side view of the folding mechanism of FIG. 5A during a later step in the folding sequence at which the leading edge of the carrier form has engaged a stop member and the lead fold line is aligned with a folding gap;

FIG. 5E is a side view of the folding mechanism of FIG. 5D during a later step in the folding sequence in which the pushing movement of the rollers on the lagging end section has pushed the carrier form pivotally away from the folding path along the lagging fold line;

FIG. 5H is a side view of the folding member of FIG. 5G during a later step in the folding sequence in which the folded carrier form has been partially pulled through a folding gap for engagement by another pusher of the carrier turning apparatus and the pushing member has been returned to the home position;

FIG. 6A is a plan view of the preferred embodiment of the carrier form turning apparatus partially shown in FIGS. 4A–4F and 5A–5H at a step in the sequence shown in both FIGS. 4F and 5H;

FIG. 6C is a plan view of the turning apparatus of FIG. 6B during a later step in the sequence during which the carrier has been fully turned and is ready for ejection to an envelope stuffer.

DESCRIPTION OF THE PREFERRED EMBODIMENT

Figure 1:
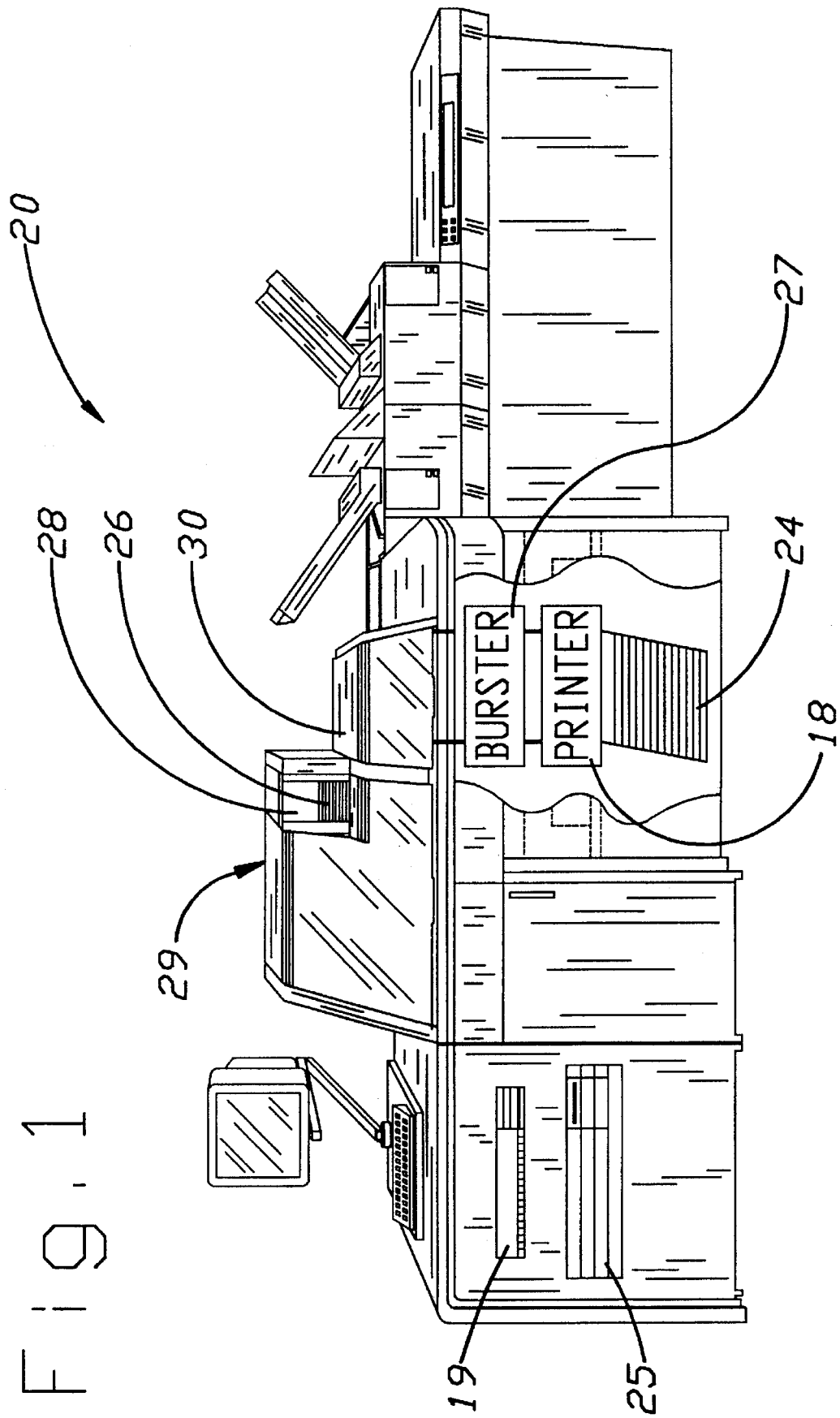
FIG. 1 is a perspective view of the preferred embodiment of the card package production system of the present invention.

Referring to FIGS. 1, 2A, 2B, 3A and 3B, the card package production system 20 has a microprocessor based computer 25 and an open reel tape drive 19 to control the insertion, rejection, folding and stuffing of cards 26 and carrier forms 24 to produce card packages. Within the card package production system 20, an interconnected fan of bifold carrier forms 24 are fed from a printer 18 to a bursting module 27 to separate the fan into individual carrier forms. The cards 26 are placed in a hopper 28 in the card package production system 20 and are transported to an embosser/encoder 29 for embossing characters and encoding a magnetic stripe on each card. The cards 26 are moved to an insertion station 23 for insertion into matching card carrier forms 24. Cards 26 which do not have information matching that of the corresponding carrier forms 24 are rejected. The cards 26 inserted into matching carrier forms 24 are transported to a card carrier form folding apparatus 30 to fold the bifold carrier forms prior to stuffing them into envelopes.

Figure 2A:
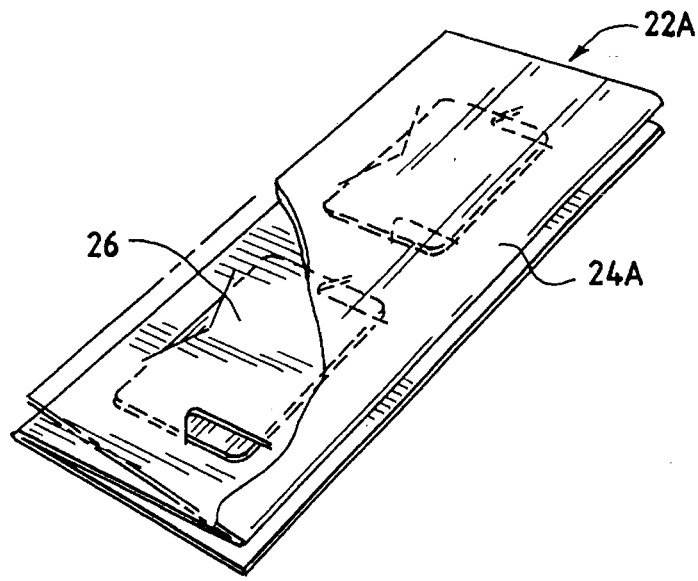
FIG. 2A is a perspective view of a first type of carrier form employed in the card package production system of FIG. 1 with a portion broken away to view one of the cards mounted therein.
Figure 2B:
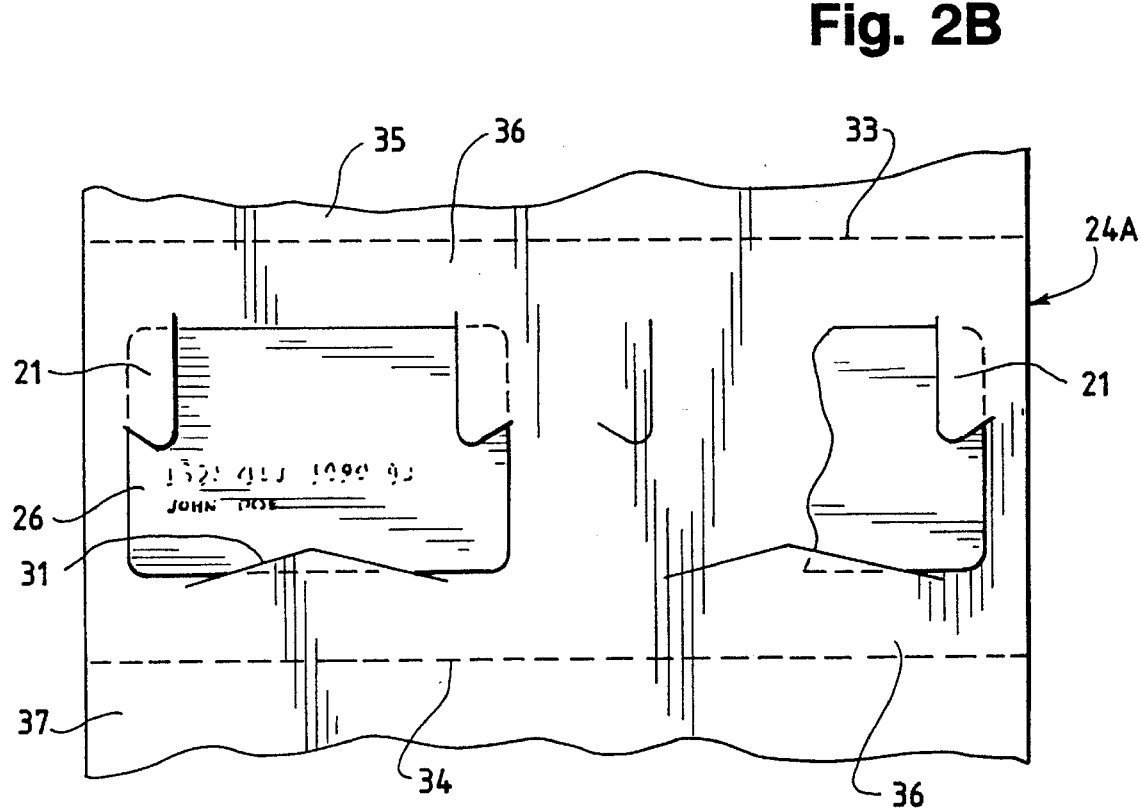
FIG. 2B is a front side view of the carrier of FIG. 2A with inserted, or mounted, cards prior to folding.
Figure 3A:
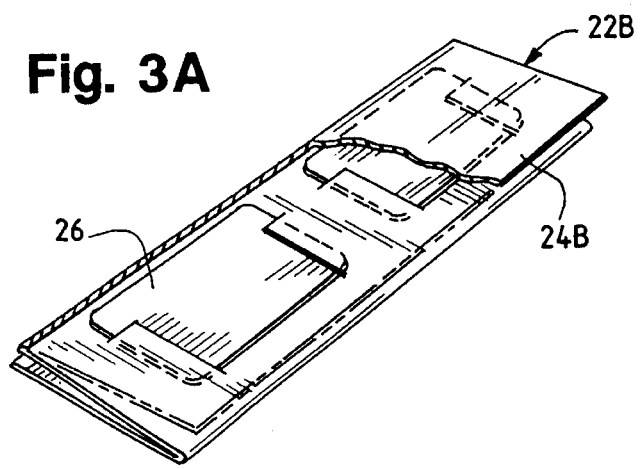
FIG. 3A is a perspective view of a second type of carrier form employed in the card package production system of FIG. 1 with a portion broken away to view one of the cards mounted therein.
Figure 3B:
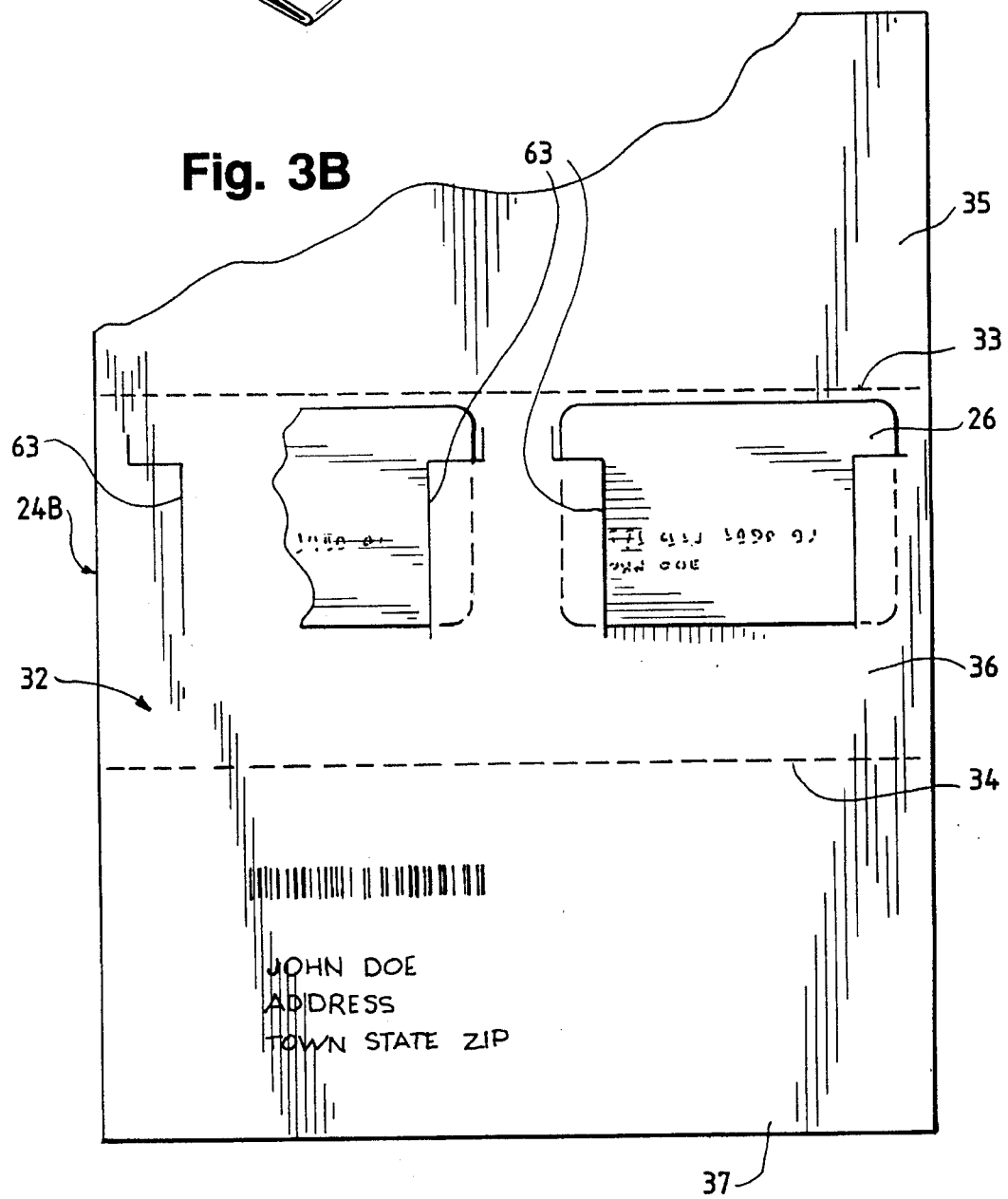
FIG. 3B is a front side view of the carrier of FIG. 3A with inserted, or mounted, cards prior to folding.

As seen in FIGS. 2A, 2B, 3A and 3B, the card package production apparatus produces card packages 22A and 22B from two different card carrier forms 24A and 24B. Carrier form 24A has a pair of corner pockets 21 to hold the card 26 against lateral sliding movement and a fold flap 31 to secure a bottom edge of the card 26. The folding of carrier form 24A of FIG. 2A is accomplished by the embodiment of the card carrier folding apparatus 30A described in FIGS. 4A through 4F. Carrier form 24B as seen in FIG. 3B has a pair of rectilinear-shaped insertion slots 63 for receipt of cards 26. The folding of carrier form 24B is performed by the card carrier for folding apparatus 30B embodiment shown in FIGS. 5A through 5H. As seen in FIGS. 2B and 3B the body 32 of each of the bifold carrier forms 24A and 24B have a pair of parallel, spaced, preweakened fold lines 33 and 34 dividing the body into a leading end 35, middle 36, and lagging end 37 sections. Fold line 33 divides the leading end 35 and middle end 36 while fold line 34 divides the middle 35 and lagging end section 37.

Referring to FIG. 4A, the bifold carrier form 24A is transported to one embodiment of the card carrier form apparatus 30A by rollers 38, 39 and 40. Roller 38 is driven by an electric motor 47 which is coupled to and controlled by the microprocessor based 486 DX computer 25, FIG. 1, of the card package production system 20. A belt 42 interconnects rollers 39 and 40 with roller 38 to rotate rollers 39 and 40. Rollers 39 and 40 pinch carrier form 24A to move the form through the folding path 44 along the length of the card carrier form folding apparatus 30A. The leading end 35 of the carrier form is transported along the length of the folding path until it abuts with a stop member 46. As seen in FIG. 4A, the stop member 46 is in a blocking position to prevent the carrier form 24A from continual movement across the folding path 44. The stop member 46 is held within slot 43 of base plate 50 by an electrically actuated brake 45. Brake 45 is coupled with the microprocessor based computer 25, FIG. 1, by electrical lead member 49.

Figure 4B:
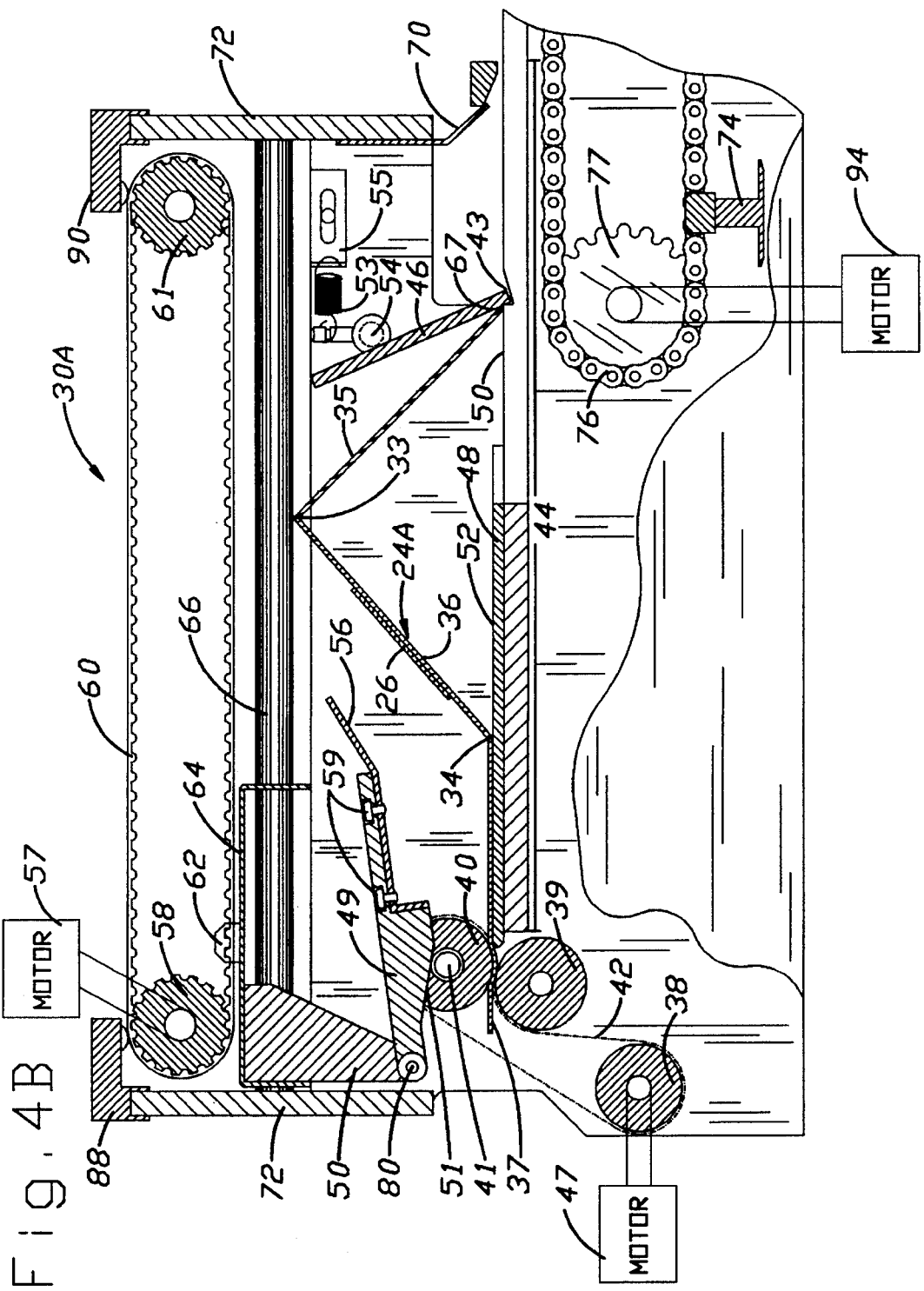
FIG. 4B is a side view of the folding mechanism of FIG. 4A during a later step in the folding sequence in which the carrier form has been pushed upwardly away from the folding path along the leading fold line.

Referring to FIG. 4B, a folding path support member 48 is mounted along the folding path 44 to base plate 50. The folding path support member 48 has an upwardly facing surface 52 for supporting the carrier form 24A as the form slidably moves along the surface. The stop member 46 extends downwardly into a blocking position to block sliding movement of the middle section 36 of the carrier 24A along the surface 52 of the folding path support member 48. The rollers 39 and 40 move the carrier forms 24A along the folding path 44 and against stop member 46 to buckle the leading end section 35 and the middle section 36 away from the folding path along preweakened fold line 33.

A spring 53 mounted to a latch member 55 is connected to a shaft lever 54 allowing movement of stop member 46 from the blocking position, as seen in FIG. 4B, to a nonblocking position away from the surface of the folding path 44 enabling the folded carrier form 24A to slidably pass between the stop member and the folding path 44 as seen in FIG. 4E. The electrically actuatable brake 45, FIG. 4A, holds the stop member 46 against pivotal swinging movement to the nonblocking position in response to pushing by the carrier form 24A. The brake 45, FIG. 4A, is connected with the elongate shaft lever 54 abutting the stop member 46. The brake 45 places a torque against the elongate shaft lever 53 in a direction opposite the movement of the carrier form 24A to actuate the stop member 46 to stop movement of a leading edge 67 of the carrier along the folding path 44. In FIG. 4B, in response to the leading section 35 abutting the stop member 46, the preweakened fold line 33 moves upwardly away from the surface 52 of the folding path support member 48. The blocking of the leading edge of the carrier 24A in conjunction with the continual movement of lagging section 37 by rollers 39 and 40 enables leading section 35 and middle section 36 to buckle away from the folding path along fold line 33.

Figure 4C:
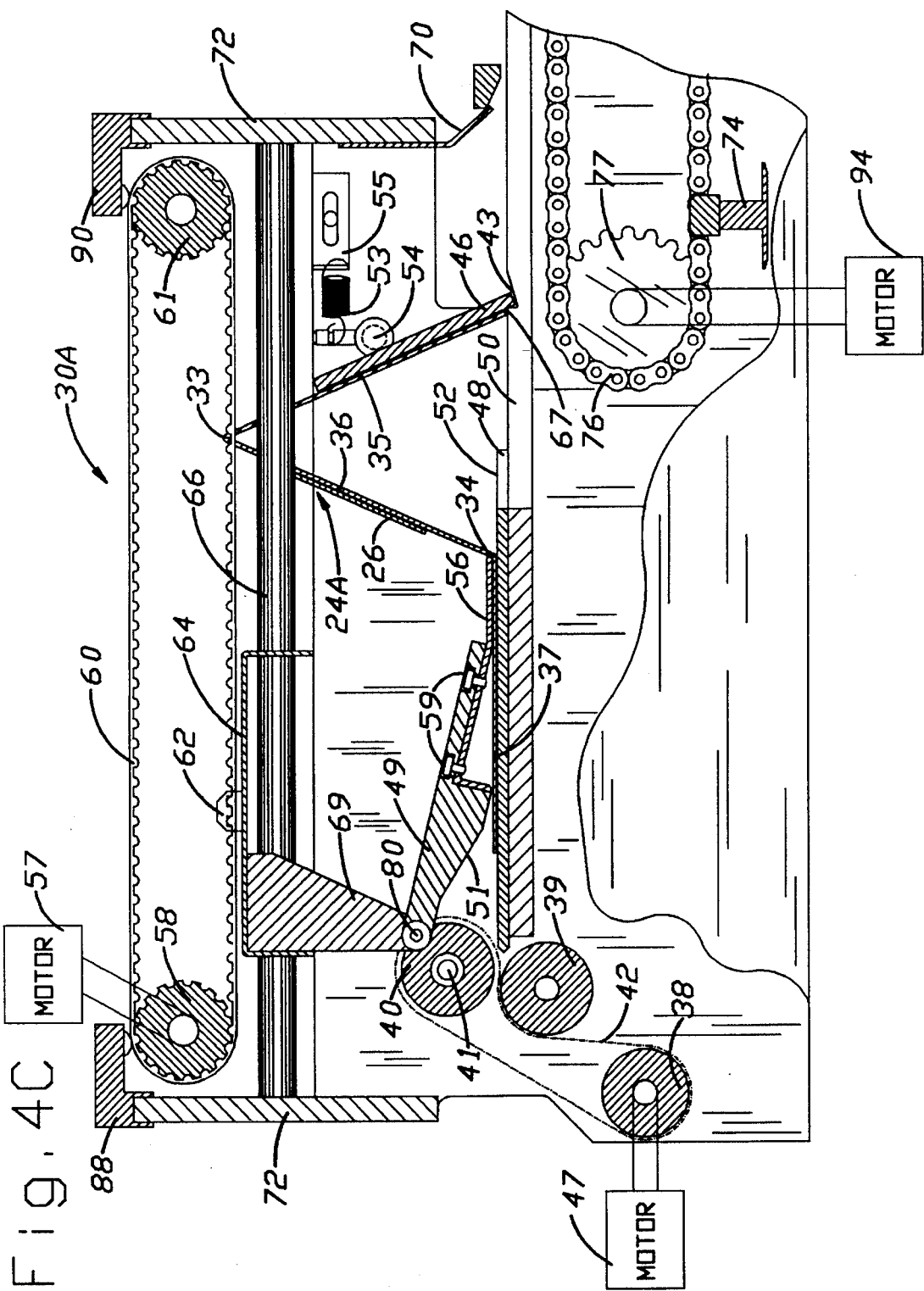
FIG. 4C is a side view of the folding mechanism of FIG. 4B during a still later step in the folding sequence in which the pusher has laterally moved into engagement with the carrier form and has begun pushing it.

Referring to FIG. 4C, in response to the leading section 35 and the middle section 36 buckling away from the folding path 44, the carrier form 24A is pushed by a pushing member 56 adjacent the fold line 34 between the lagging end section 37 and the middle section of the carrier form. A cam member 49 is connected to the pushing member 56 by connectors 59. The cam member 49 has a cam surface 51 which is slidably engageable with a camming member 41 to pivotally move pushing member 56 laterally relative to the folding path 44. As seen in FIGS. 4A and 4B, the cam surface 51 of the cam member 49 mountably rests on the camming member 41, the axle of roller 40, to enable the carrier 24A to pass between the pushing member 56 and the folding path 44. Movement of the pushing member is accomplished by an electric motor 57 coupled with a drive sprocket 58. A belt 60, FIG. 4C, extends across a distance parallel with the folding path 44 and interconnects sprocket 58 with another sprocket 61. Hinge 62 connected with belt 60 is attached to sliding member 64 for movement along sliding bar 66 extending between the housing walls 72 of the carrier form folding apparatus 30A. Plate 69 is pivotally attached to cam member 49 by pin 80. In response to motor 57 driving belt 60, the sliding member 64 and plate 69 translationally move across the length of sliding bar 66 and, in turn, the pushing member 56 along the folding path 44. Camming member 41 mounts the cam member 49 connected to the pushing member 46 for lateral movement relative to folding path 44 into pushing engagement with the carrier 24A in response to the middle section 36 being slidably moved by rollers 39 and 40. As seen in FIG. 4C, the camming surface 51 of cam member 49 slidably moves off the axle 41 of roller 40. The pushing member 56 drops into the engagement with the carrier 24 at fold line 34 adjacent the lagging end section 37. As the belt 60 moves laterally across a length of the folding path 44, the pushing member 46 moves the lagging end section 35 while the leading end is releasably held against movement by the stop member 46 to fold the carrier form 24A. The card carrier folding apparatus 30A has a home sensor 88 coupled with the microprocessor based computer 25, FIG. 1, to sense the sliding member 64 when in the home position.

In FIGS. 4A and 4B, the card carrier folding apparatus 30A is shown in the home position with the cam surface 51 mounted to the axle 41 of roller 40. In response to the home sensor 88 sensing the sliding member 64 in the home position, the sensor 88 signals the computer 25, FIG. 1, to advance a carrier form 24A through rollers 39 and 40. When in the home position the carriers 24A slidably pass between the pushing member 46 and the folding path 44. The home sensor 88 acts to stop the operation of the folding apparatus 30A if the sliding member has not returned to the home position after a predetermined period of time thereby preventing additional carrier forms from building up along the folding path 44 if the pushing member 56 is not at the home position.

The activation of motor 57 to move the sliding member 64 along the elongate sliding bar 66 to drop the pushing member 56 onto the lagging end section 37 of the carrier 24A and, in turn, pushing the carrier along the surface 52 of the folding path 44 is done in response to a signal being received at the computer 25, FIG. 1, from an optical sensor located at the bursting station 27 of the embossed card package production apparatus 20. An optical light sensor at the bursting station 27 senses a sensing hole in the card carrier form 24A as the carrier moves through the burster 27. A predetermined time after the sensing occurs the computer 25, FIG. 1, signals motor 57, FIG. 4C, to turn on and to advance the pushing member 46 along the folding path 44. The predetermined time is based on the amount of time it takes the carrier to move from the burster 27, FIG. 1, through the inserter 23 and the folding path until the fold line 34 at lagging section 37 is in alignment with the pushing member 56. For further details of the optical hole sensor and its operation within the bursting module 27 reference can be made to U.S. patent application Ser. No. 08/036,159 of Hill et al. entitled "Card Package Production System with Burster and Carrier Verification Apparatus" filed Mar. 24, 1993, filed contemporaneously herewith.

Referring to FIG. 4D, the pushing member 56 moves the fold line 34 laterally across the folding path 44 approximately adjacent to an edge of the carrier 24A adjacent the leading end 35. The stop member 46 is tilted backwards against the movement of the carrier 24A along the folding path 44 to hold the carrier from flipping over on edge.

Referring to FIG. 4E, the movement of the pushing member 56 is seen to pivotally swing the stop member 46 from the blocking position, shown in FIGS. 4A–4D, to a non-blocking position in which the carrier 24A is enabled to pass between the stop or blocking member 46 and the folding path 44. The carrier 24A is pushed by the pushing member 56 past the stop member 46 after the carrier is folded at fold lines 33 and 34. The stop member 46 is pivotally mounted to spring out of the way of the moved folded carrier form 24A when the stop member is not selectively held in the blocking position by the brake 45, FIG. 4A, against the elongate shaft lever 54. The microprocessor based computer 25, FIG. 1, signals the brake 45, FIG. 4A, to be released against elongate shaft 54 a predetermined time, approximately one half second, after the motor 57 is activated to move the pushing member 56 along the folding path 44. The release of brake 45, FIG. 4A, against shaft member 54 enables the stop member 46 to pivotally swing upward as the pushing member passes between it and the folding path. The leading end section 35 and the middle section 36 are folded down against each other between the stop member 46 and the cam member 49. The movement of the pushing member 56 releases the leading end section 35 from being held against movement along the folding path 44 by the stop member 46 to complete the folding of the carrier form 24A.

The carrier 24A moves from a first folding position as seen in FIG. 4B in which both fold lines 33 and 34 are located on one side of the pushing member 56 to a second folding position as seen in FIGS. 4E and 4F at which the carrier form 24A is guided through a folding fixture 70 along the folding path 44. The folding fixture 70 mounted to the housing 72 of the card carrier form folding apparatus 30A is angled to the flow of the carrier to naturally guide the folded carrier form 24A against the folding path 44. In response to the activation of motor 57 the carrier form 24A is moved from the first folding position by the pushing member 56 along the folding path 44 through the folding fixture 70 to fold the form. The angled member of the folding fixture 70 and the surface of plate 50 along the folding path defines a folding gap through which the carrier form 24A is pushed through to assist in collapsing the carrier into a folded position.

Referring to FIG. 4F, the carrier form 24A is shown in the folded position with the leading section 35 overlying the middle section 36 and the lagging section 37 underlying the middle section resting adjacent the folding path 44. The motor 57 is activated in response to a fold complete sensor 90 sensing the sliding member 64 in the folded position to move the belt 60 in a reverse direction to that of the folding path 44. The fold complete sensor 90 senses the sliding member 64 when it has moved laterally along the elongate bar to the folded position shown in FIG. 4E. In response to the reading by the fold complete sensor 90, the computer 25, FIG. 1, activates motor 57 to return the sliding member 64 with the pushing member 56 to the home position, FIG. 4F. The drive belt 60 moves the sliding block member 64 along the sliding bar 66 to return the pushing member 56 to the home position with the cam member 49 resting against the axle 41 of roller 40. In the home position the pushing member 56 is mounted against axle 41 for lateral movement relative to the folding path 44 for pushing engagement with the carrier 24A. The pushing member 56 is again moved away from the folding path 44 to enable a next carrier 24A transported by rollers 39 and 40 to pass between the pushing member and the folding path. The stop member 46 is releasably mounted in the blocking position of the folding path 44. The electric brake 45, FIG. 4A, reapplies pressure to the stop member 46, FIG. 4F, to block movement of the next carrier.

In response to the sensing of the sliding member 64 by the fold complete sensor 90 transporting pushing pin 74 member interconnected with a chain 76 turns and transports the folded carrier form. The fold complete sensor 90 sends a signal to motor 94 indicating that the carrier form 24A is folded and is ready to be transported. A motor 94 under the control of the microprocessor based computer 25 of the card package production system 20, FIG. 1, turns sprocket 77 to drive chain 76 to move the folded carrier by pushing pin member 74. In response the movement of chain 76 the pushing pin 24 protrudes through a slot opening in plate 50 to transport the folded carrier 24A.

Figure 5C:
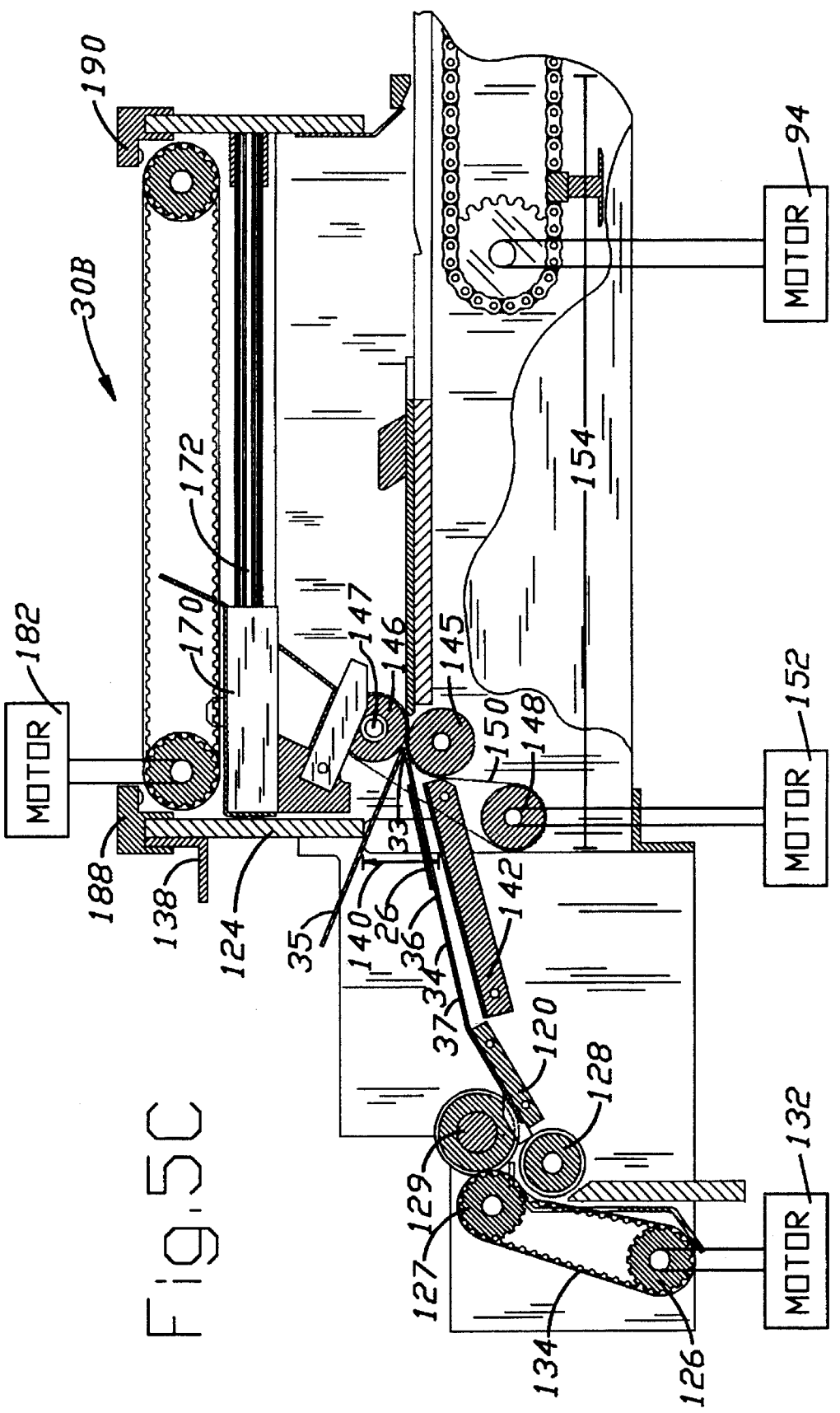
FIG. 5C is a side view of the folding mechanism of FIG. 5B during a still later step in the folding sequence in which the carrier form has been folded at the lead fold line and pushed through the folding gap for engagement between a pair of rollers.

Referring to FIGS. 5A–5H, another embodiment of the card carrier form folding apparatus 30B of the present invention is shown to fold the carrier form 24B of FIGS. 3A and 3B with inserted card 26. In FIG. 5A, the card carrying form 24B is moved in a substantially horizontal direction from a carrier support member 120 until the carrier abuts with a vertically mounted stop guide 124. The carrier 24B is moved by gears 126 and 127 connected by belt 134 to turn roller 128. Electric motor 132 drives gear 126 which in turn moves gear 127 through drive belt 134. Belt 134 is mounted in movable relation with roller 128 to drive roller 128. The leading end 35 of carrier 24B is moved to the stop guide 124 by roller 128 through carrier support member 120. Idle roller 129 is used to open the flaps 63, FIG. 3B, of carrier 24B to aid in the insertion of cards 26. For further description of the insertion of card 26 into carrier form 24B of FIG. 3B, reference can be made to U.S. patent application Ser. No. 08/036,654 of Hill et al. entitled "Embossed Card Package System With Modular Inserters For Multiple Forms And Card Verification Apparatus" filed Mar. 24, 1993, contemporaneously filed herewith.

The carrier support member 120 has a support surface 136 for slidable support of the carrier form 24B being moved by roller 128 in the first direction toward stop guide 124. The carrier support member or middle guide 120 extends in a diagonal direction to direct and guide the leading end 35 of the carrier form 24B to the stop guide. The leading end 35 moves in a second, substantially vertical direction along the surface of the stop guide in response to the leading end section 35 coming into contact with the stop guide. Roller 128 continues to move the leading end section 35 vertically along the surface of the stop guide until the leading end abuts with stop member 138.

Referring to FIG. 5B, the stop guide 124 is shown to guide the carrier form 24B vertically to the stop member 138. The L-shaped stop member 138 is mounted to and extends transversely to the stop guide 124. A fold gap 140 exists between the stop guide 124 and a channel plate 142. The leading end section 35 of the carrier 24B is guided by guide plate 124 to move vertically until the fold line 33 between the leading section 35 and middle section 36 of carrier 24B is aligned with the folding gap 140. The stop member 138 stops the vertical movement of the leading section 35 when the fold line 33 is aligned with the folding gap 140. Roller 128 continues to push the carrier form 24B through the folding gap 140 along channel plate 142 and the rollers 145 and 146.

Referring to FIG. 5C, the middle section 36 and the leading end section 35 adjacent fold line 33 are fed through fold gap 140. As the fold line 33 passes through fold gap 140 the leading section 35 moves downward away from the stop member 138 and begins to fold together with the middle section 35 along the fold line. The fold line 33 moves through rollers 145 and 146 to fold leading section 35 back against one side of the middle section 36. Electric motor 152 coupled with the microprocessor based computer 25, FIG. 1, powers roller 148, FIG. 5C, to drive rollers 145 and 146 interconnected through belt 150. Rollers 145 and 146 move the carrier 24B folded at fold line 33 along the folding path 154. A home position optical sensor 188 senses the sliding bar 170 mounted by elongate sliding bar extending substantially parallel along the length of the folding path 154 to signal the computer 25, FIG. 1, that the form folding apparatus 30B is in the passing position. The home position sensor 188 operates in the same manner as sensor 88 described above with reference to FIGS. 4A and 4B. The home position sensor 188 signals to the computer 25, FIG. 1, to feed carrier 24B through the folding path 154.

Figure 5D:
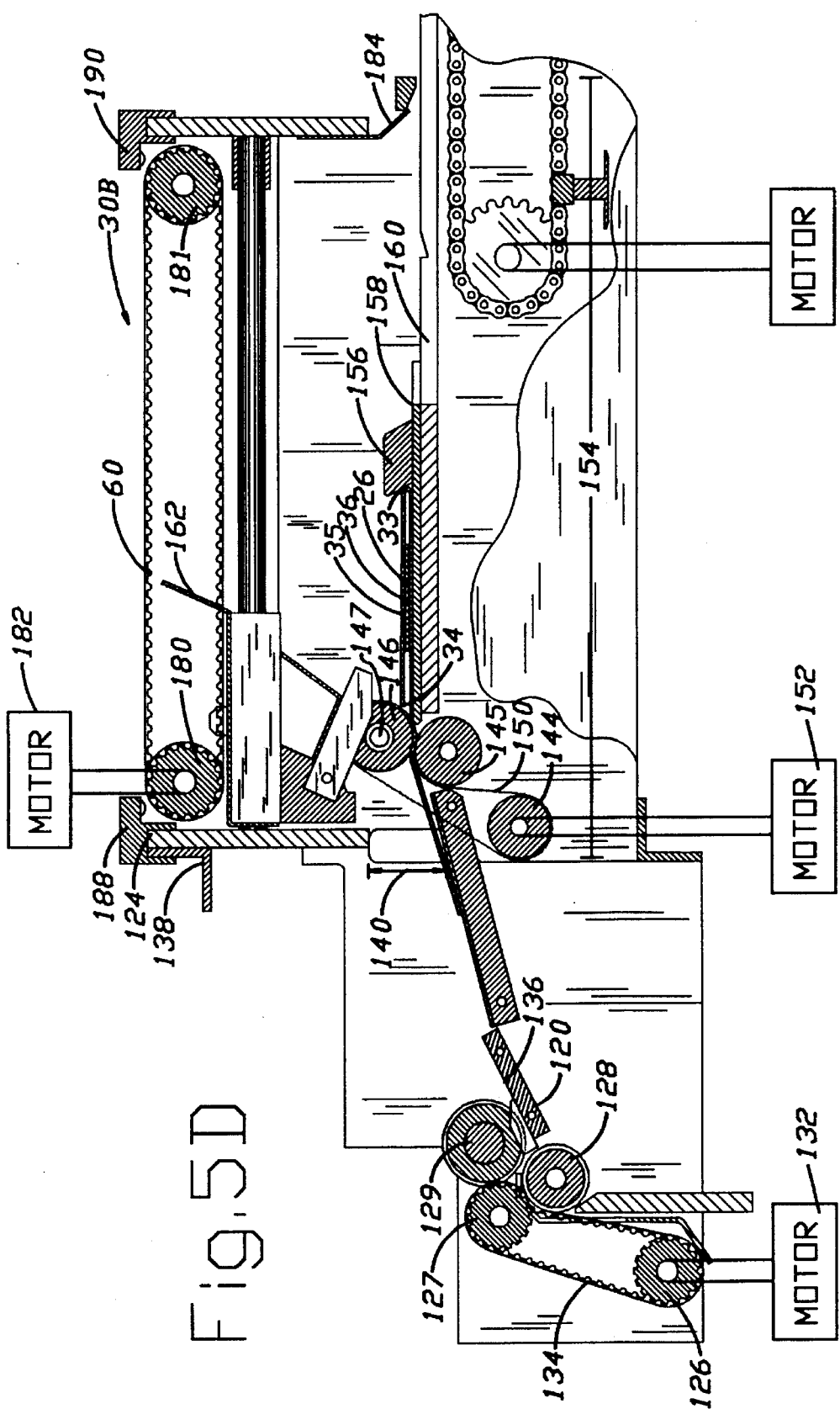
FIG. 5D is a side view of the folding mechanism of FIG. 5C in which the carrier engages at the folded edge between the leading end section and middle section have been pushed against a stop member.

Referring to FIG. 5D, the carrier form 24B folded along fold line 33 is moved along the folding path 154 on a side of the folding gap 140 opposite of the carrier support member 120. The fold along fold line 33 prevents the card 36 from falling out of the carrier 24B through the rectilinear slots 63, FIG. 3B. Rollers 145, FIG. 5, and 146 in rolling contact with the carrier form 24B move the lagging end section 37 through the gap 140 and along the folding path 154. A stopping member 156 mounted to the surface of a folding path support member 158 supported by base plate 160 blocks movement of the folded edge along fold line 33 of the carrier 24B. As the lagging section 37 is moved through the folding gap 140, the fold line 34 between the lagging section and the middle section 36 buckles upwards away from the folding path 154 in response to the blocking of the carrier 24B at fold line 33 against the stopping member.

Referring to FIG. 5E, the blocking member 156 forces the fold line 34 between the middle section 36 and lagging section 37 to move up as the lagging section is moved towards the stopping member. The lagging section 37 of carrier 24B partially abuts the pushing member 162. The folded carrier form 24A pivots about the folded edge 33 between the leading section 35 and middle section 36 while the form is being pushed into the stopping member 156. The pushing member 162 is attached to a pivoting member 164 which is pivotally mounted on the axle 147 of rollers 146 for lateral movement relative to the folding path 154. The pivoting member 164 is pivotally connected to plate 166 by pin 168. The plate is interconnected with sliding member 170 which is slidably mounted to elongate sliding bar 172 extending between the stop guide 124 and the folding apparatus housing 174. Hinge 176 attaches the sliding member to belt 178 which is driven between gears 180 and 181 by motor 182. Motor 182 is actuated to drive the belt 178 in response to a signal received from the microprocessor based computer 25, FIG. 1, coupled with motor 182. Motor 182 is activated to move pushing member 162 after a predetermined time from an optical sensing of the carrier by a sensor located at the bursting station 27. The activation of motor 182 is the same as the manner discussed above for operating motor 57 with reference to FIG. 4C.

The motor 182 drives belt 178 to move sliding member 170 across the folding path 154 along sliding bar 172. The pivoting member 164 connected with pushing member 162 pivots down about pin 168 as the pivoting member rolls off axle 147. The pushing member 162 begins to push against the upwardly bucked body of the end section 37 as it laterally moves down toward the folding path 154. The sliding member 170 supported by the elongate sliding bar 172 mounts the pushing member 162 for translational movement along the folding path 154 to push the carrier form 24B along the folding path.

Figure 5F:
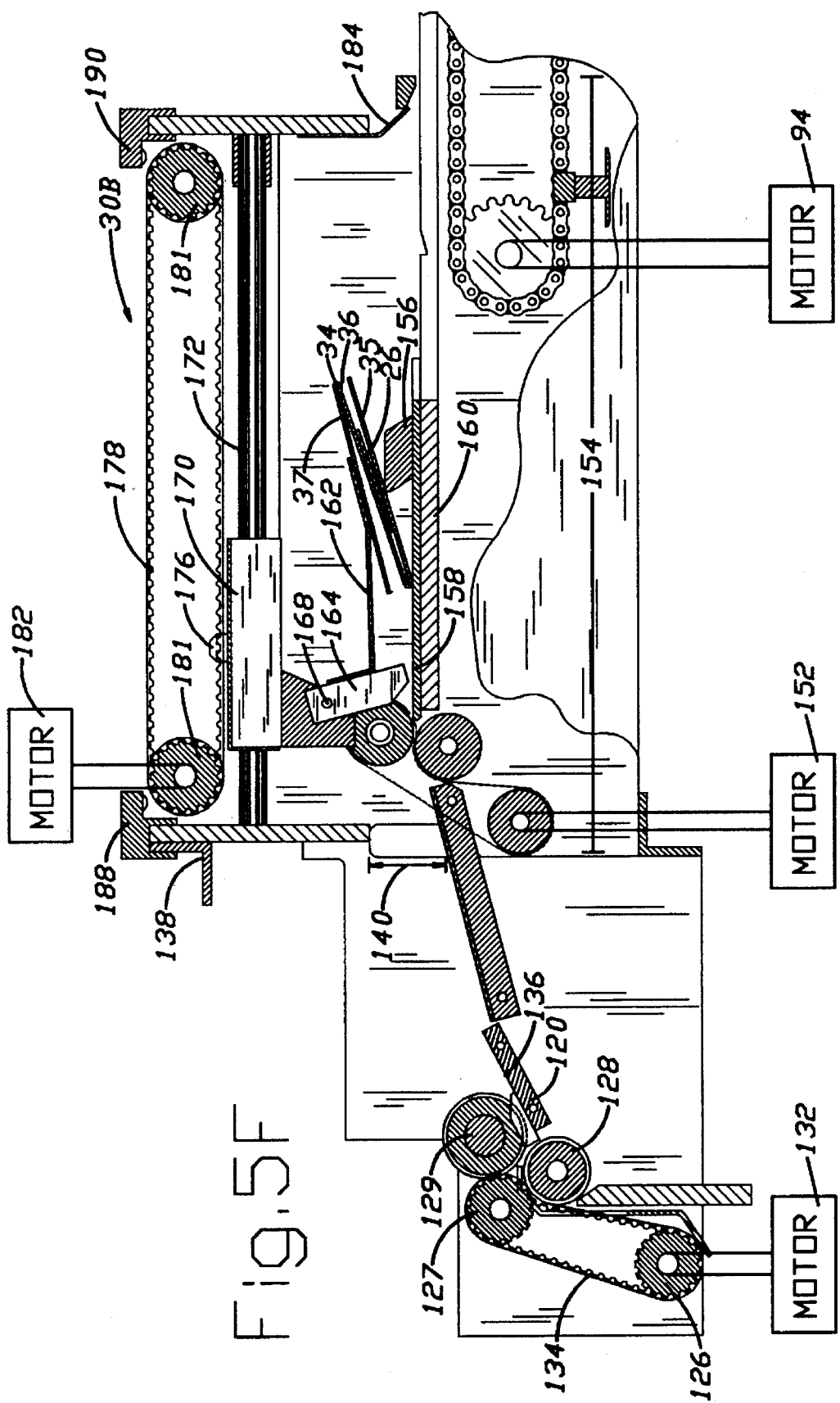
FIG. 5F is a side view of the folding mechanism of FIG. 5E during a later step in the folding sequence in which a pushing arm has pivoted downwardly and moved in the direction of carrier movement to flip the carrier form over the stop member.

Referring to FIG. 5F, belt 178 translationally moves the pushing member 162 across the folding path 154. The pivot member 164 rolls off the axle 147 of roller 146 to enable the pushing member to fold the lagging end section 37 toward folded engagement with the side of the middle section 36 opposite that of the folded side with the leading section 35. The pushing member 162 pushes the body of the lagging section 37 at a location spaced from the edge of the lagging section. As the pushing member 162 is moved along the folding path 154 the pushing member tips the lagging end section 37 over the stopping member 156 and onto the middle section 36. As seen in FIGS. 5B–5D, the pushing member 152 is moved to a passing section in which the carrier form 24B is enabled to pass by the pushing member 146 along the folding path 154. In FIG. 5F, the pivot member 164 connected with the pushing member 162 is moved off axle 147 laterally relative to the folding path 154 to the pushing position in which the pushing member is engageable with the carrier form 24B on the path. In response to a signal from the computer 25, FIG. 1, after a predetermined time from the sensing the carrier 24B at a location in the burster 27, the drive motor 182 is actuated to laterally move the pushing member 162 relative to the folding path 154. The pushing member 162 moves an edge of the lagging end section 37 toward the stopping member 156 to fold the lagging section against the middle section 36. As the sliding member 170 continues to move across the elongate sliding bar 172, the pushing member 162 slides along the surface of the lagging section 37 until the pivot member 164 abuts with the carrier form 24A. The pivot member 164 moving translationally along the folding path 154 pushes the lagging section 37 and middle section 36 over the stopping member 156 onto the leading end section 35. The folded carrier form 24B is flipped over the stopping member 156 in such a manner that the leading end section 35 faces in an opposite direction to the direction faced prior to being flipped.

Figure 5G:
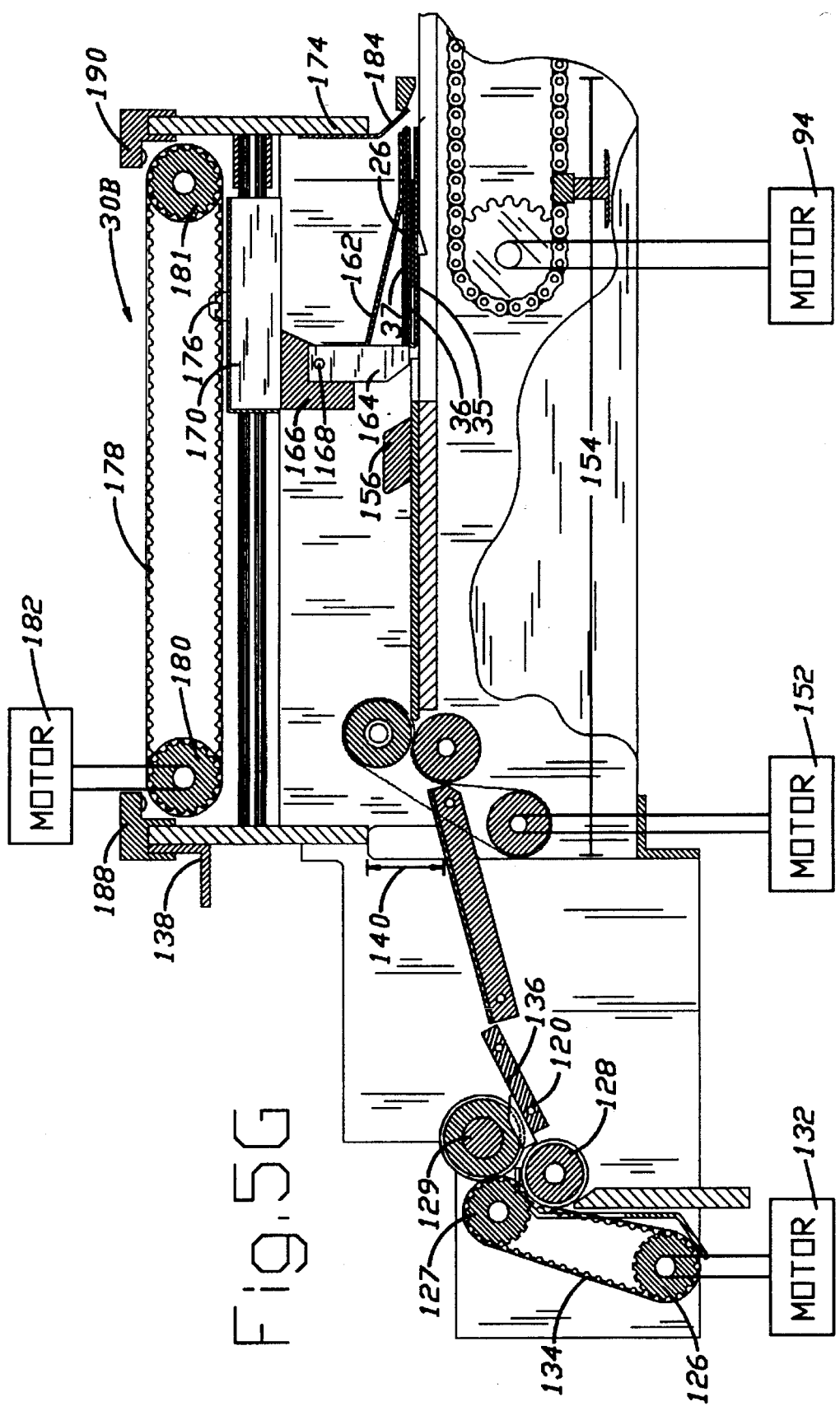
FIG. 5G is a side view of the folding mechanism of FIG. 5F during a later step in the folding sequence in which the pushing arm is engaged with the edge of the folded carrier form and pushed it over the stopping member.

Referring to FIG. 5G, the card carrier form folding apparatus 30B is shown in the pushing position in which the pushing member 162 and the connected pivot member 164 are engaged with the carrier 24B on the folding path 154. The pivoting member 164 slidably engages an edge of the lagging section 37 to push the carrier 24B along the surface of the folding path. The pushing member 162 pushes down on the lagging end section 37 to fold the lagging section along fold line 34 against middle section 35. The folded and flipped carrier form 24B is pushed by the pushing member 152 and the pivoting member 164 through an angled folding fixture 184 connected with the folding apparatus housing 174. The folding fixture 184 is angled to act as a guide to ensure a complete fold of the carrier form 24B.

Referring to FIG. 5H, the card carrier form folding apparatus 30B is returned to the passing position in which the pivoting member 164 slidably rests on the axle 147 of roller 146 and the pushing member 162 is spaced from the carrier forms 24B enabling them to pass along the folding path 154 to a position to be pushed. The motor 182 is actuated to stop and return to the pushing member 162 to the passing position by the fold complete sensor 190 sensing the sliding member when in the folded position as seen in FIG. 5G. The fold complete sensor 190 coupled with the computer 25, FIG. 1, senses the sliding member 170 when the carrier has been folded and triggers the motor 182 to drive the belt 178 to return to the home or passing position. In response to the pushing member 162 being returned to the passing position, a transportation pin member 74 connected with chain linkage 76 is moved through a slot opening 242, FIG. 6A, of the base plate 160. A motor 94 connected with gear 77 drives the chain linkage 192 to move the transport pin to the folding path 154 upon the fold complete optical sensor 190 sensing a change in light due to the sliding member being moved to the fold position as seen in FIG. 5G. This indicates that the folding of the carrier 24B is complete and the carrier is ready to be transported. The pushing pin member 74 moves along a slot opening, FIG. 6A, to spin and rotate the folded carrier forms 24A and 24B.

Referring to FIG. 6A, carrier form 24 is shown having been folded by the card carrier form folding apparatus 30. The folded carrier 24 is turned for transportation to a folded carrier outlet station 240 by means of a transporting pushing pin member 74 interconnected with a circulating chain member 76. As seen in FIGS. 4F and 5H, the chain 76 is interconnected to a sprocket gear 77 driven by motor 94 in response to the fold complete sensor 90 or 190 sensing either sliding member 64 or 170 being in the fold complete position in both embodiments 30A and 30B of the carrier folding apparatus. The chain 76 is connected to another sprocket gear (not shown) to circulate pushing member 74 through the elongate slot opening 242. The motor 94, FIG. 4F, drives chain 76 to move the pushing member 74 through slot opening 242, FIG. 6A, and into contact with an edge 222 of the carrier form. In FIG. 6A, the folded carrier 24 is shown having a preselected orientation with a side edge 226 of the carrier substantially parallel to the elongate slot opening 242. The pushing member 24 transports the carrier in a preselected direction as shown by direction arrow 235 parallel to the planar body of the carrier. As seen in FIG. 6A, the folded carrier 24 has its fold lines 33 and 34 aligned in a direction generally transverse to the preselected direction indicated by arrow 235.

Extending vertically from the folded carrier support surface plate 234 is a pivot pin 220. The pushing member 74 pushes one edge 224 of the carrier form into the pivot pin 220 to pivot edge 224 about pin 220 and to turn the folded carrier 24. Another pivot pin 230 is located adjacent pivot pin 220 to engage another edge 226 of the carrier 24 adjacent the one edge 224. Pushing member 74 engages the back edge 222 of the carrier form 24 opposite edge 224 at a location laterally spaced from the pivot pin 220 at a distance greater than the width dimension along edge 226 of the carrier 24 for movement of the carrier transverse to fold lines 33 and 34. The spacing of the pushing member 74 relative to the pivot pin 220 allows the carrier form to turn and pivot about pin 220 as the carrier is moved by the pushing member.

Figure 6B:
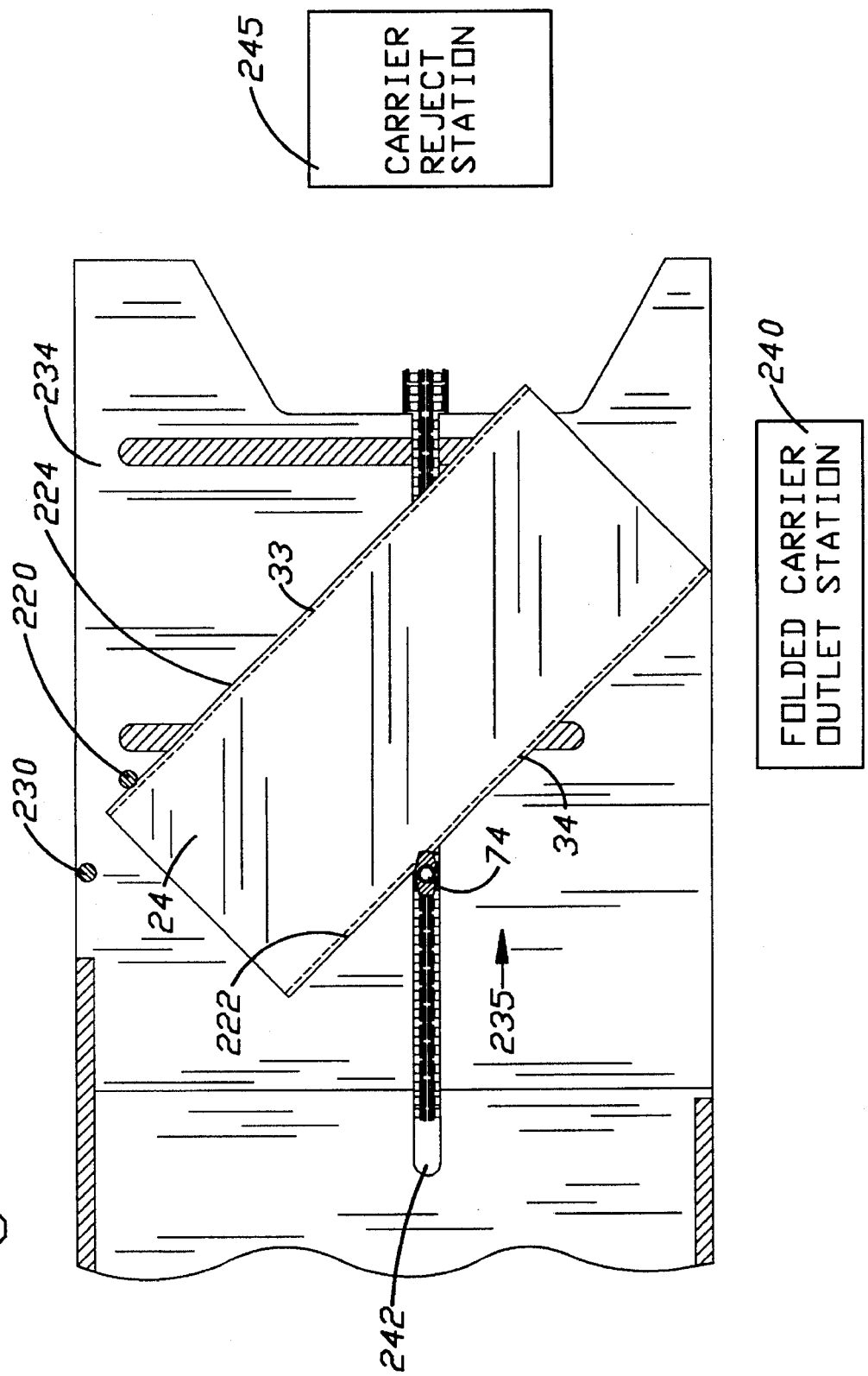
FIG. 6B is a plan view of the preferred embodiment of the carrier form turning apparatus of FIG. 6A during a later step in the sequence in which the carrier has been partially pivoted around a pivot pin.

Referring to FIG. 6B, the pushing member 24 slides along edge 222 opposite edge 224 as the chain 76 moves the pushing member in the preselected direction indicated by arrow 235 to a location opposite the pivot pin 220. As the carrier 24 is transported it is turned counterclockwise about pivot pin 220. The movement of pushing pin 74 turns the folded carrier in the plane of the planar body from the preselected orientation, seen in FIG. 6A, to the orientation shown in FIG. 6C.

Referring to FIG. 6C, the pushing member 74 turns the folded carrier 24 about pivot pin 220 approximately ninety degrees to substantially align the fold lines 33 and 34 with the preselected direction which the carriers are transported as indicated by arrow 235. The pushing member 74 moves the folded carrier form 24 about pivot pin 220 until edge 222 is substantially parallel to the preselected direction 235. The turned and folded carrier 24 is in a position to be transported by a pair of upper claws (not shown) to the folded carrier outlet station 240. The folded carriers are fully turned for ejection to an envelope stuffer at the folded carrier outlet station 240. Carrier packages 22, FIGS. 2A, 3A, having cards 26 inserted into corresponding and matching carrier forms 24 are stacked at the folded carrier outlet station 240 for stuffing into window envelopes. Carriers 24 not containing matching embossed cards 26 are transported to a carrier reject station 245 to separate carriers having incorrect information from the matching carrier forms thereby preventing incorrect carriers from being stuffed into window envelopes and subsequently being mailed. For further details concerning other aspects of the embossed card pack production system, reference should be made to the following applications filed contemporaneously herewith and assigned to the same assignee of the present invention:

U.S. patent applications Ser. No. 08/036,657 of Hill et al. entitled "Automatic Verified Embossed Card Package Production Methods" filed Mar. 24, 1993; Ser. No. 08/036,159 of Hill et al. entitled "Card Package Production System With Burster and Carrier Verification Apparatus" filed Mar. 24, 1993; Ser. No. 08/036,664 of Hill et al. entitled "Embossed Card Package System With Modular Inserters For Multiple Forms And Card Verification Apparatus" filed Mar. 24, 1993; and Ser. No. 08/036,436 of Hill et al. entitled "Card Carrier Forms For Automated Embossed Card Package Production System" filed Mar. 24, 1993, all filed contemporaneously herewith.

While a detailed description of the preferred embodiment of the invention has been given, it should be appreciated that many variations can be made thereto without departing from the scope of the invention as set forth in the appended claims.

I claim:

1. In a card package production system for producing card packages with cards mounted to a bifold carrier form with a body and a pair of parallel, spaced, first and second preweakened fold lines dividing the body into a leading end section, a middle section and a lagging end section, the improvement being a card carrier form folding apparatus, comprising:

means for defining a folding path;

a stop member in the folding path; and means for moving the bifold carrier form along the folding path and into the stop member to buckle the leading end section and the middle section away from the folding path along said first preweakened fold line therebetween and to simultaneously fold the bifold carrier form along said second preweakened fold line between the middle section and the lagging end section.

2. The card package production system of claim 1 in which the means for defining a folding path includes a folding path support member with a surface for supporting the bifold carrier form for slidable movement therealong, and the stop member extends downwardly relative to the surface of the folding path support member into a blocking position to block sliding movement along the surface of the folding path support member.

3. The card package production system of claim 2 including means for mounting the stop member for movement away from the surface of the folding path to a nonblocking position to enable the folded bifold carrier form to slidably pass therebetween, and means for slidably moving the folded bifold carrier form between the stop member and the folding path surface to fold down the leading end section against the middle section.

4. The card package production system of claim 3 in which said mounting means includes means for mounting the stop member to pivotally swing to the nonblocking position when pushed by the bifold carrier form.

5. The card package production system of claim 4 including means for selectively holding the stop member against pivotal swinging movement to the nonblocking position in response to pushing by the bifold carrier form.

6. The card package production system of claim 5 in which the selectively holding means includes an electrically actuatable brake connected to the movably mounting means.

7. The card package production system of claim 1 including means for selectively enabling the bifold carrier form to push past the stop member after the bifold carrier form is folded at both the fold lines.

8. The card package production system of claim 1 in which the moving means includes means for pushing the bifold carrier form body adjacent the fold line between the lagging end section and the middle section after the leading end section and the middle section have buckled away from the folding path.

9. The card package production system of claim 8 in which the pushing means includes a pushing member, means for mounting the pushing member for sliding movement along the folding path, and means carried by the sliding movement mounting means for mounting the pushing member for lateral movement relative to the folding path into pushing engagement with the bifold carrier form in response to the middle section being slidably moved thereby by the sliding movement mounting means.

10. The card package production system of claim 9 in which said lateral movement mounting means includes means for pivotally mounting the pushing member for lateral movement relative to the folding path, a camming member, and a cam member carried by the pushing member with a cam surface slidably engageable with the camming member during sliding movement to pivotally move the pushing member laterally relative to the folding path.

11. The card package production system of claim 1 in which said carrier moving means includes a pushing member to push the bifold carrier form, and means for moving the pushing member away from the folding path to enable the folded bifold carrier form to pass between the pushing member and the folding path.

12. In a card package production system for producing card packages with cards mounted to a bifold carrier form with a body and a pair of parallel, spaced, preweakened fold lines dividing the body into leading end, middle and lagging end sections, the improvement being a card carrier form folding apparatus, comprising:

means for defining a folding path;

means for pushing the bifold carrier form along the folding path;

means for moving the bifold carrier form to a first folding position in which both fold lines are on one side of the pushing means;

a folding fixture at a second folding position along the folding path through which bifold carrier forms are moved to be folded; and means responsive to movement of the bifold carrier form to the first folding position to actuate the carrier pushing means to push the bifold carrier form along the folding path and through the folding fixture to fold the bifold carrier form.

13. The card package production system of claim 12 in which the pushing means includes a pushing member, means for mounting the pushing member for sliding movement along the folding path, and means carried by the sliding movement mounting means for mounting the pushing member for lateral movement relative to the folding path into pushing engagement with the bifold carrier form in response to the middle section being slidably moved thereby by the sliding movement mounting means.

14. The card package production system of claim 13 in which said lateral movement mounting means includes means for pivotally mounting the pushing member for lateral movement relative to the folding path, a camming member, and a cam member carried by the pushing member with a cam surface slidably engageable with the camming member during sliding movement to pivotally move the pushing member laterally relative to the folding path.

15. The card package production system of claim 12 in which pushing means includes a pushing member to push the bifold carrier form, and means for moving the pushing member away from the folding path to enable the bifold carrier form to pass between the pushing member and the folding path.

16. The card package production system of claim 12 in which said carrier moving means includes a roller.

17. The card package production system of claim 12 in which said responsive means includes means for sensing when the bifold carrier form is in the first folding position and ready to be pushed, and means responsive to said sensing means to actuate the pushing means.

18. The card package production system of claim 12 in which said pushing means includes a pushing member, and means for moving the pushing member into engagement with the bifold carrier form at the fold line adjacent the lagging end section to push it to approximately adjacent with an end of the bifold carrier form adjacent the leading edge.

19. The card package production system of claim 18 in which said folding fixture includes a member defining a folding gap through which the bifold carrier form is pushed through to assist in collapsing the bifold carrier form into a folded position.

20. The card package production system of claim 12 in which the folding fixture includes a stop member, and means for selectively actuating the stop member to stop movement of a leading edge of a bifold carrier form along the folding path and to enable a folded carrier to pass between the stop member and the folding path defining means.

21. In a card package production system for producing card packages with cards mounted to a bifold carrier form with a body and a pair of parallel spaced preweakened fold lines dividing the body into leading end, middle and lagging end sections, the improvement being a card carrier form folding apparatus, comprising:

means for releasably holding the leading end section against movement along the folding path;

means for moving the lagging end section toward the leading end section while a leading edge of the leading end is releasably held against movement to fold the bifold carrier form; and means for actuating the releasable holding means to release the leading end section for movement after the form is partly folded to enable completion of folding of the bifold carrier form.

22. The card package production system of claim 21 in which said releasably holding means includes a stop member for selectively blocking movement of the leading end section from movement past the stop member.

23. The card package production system of claim 21 in which the lagging end section moving means includes means for pushing the lagging end section to move the middle section.

24. The card package production system of claim 21 in which said releasable holding means includes a stop member, means for movably mounting the stop member for movement between a blocking position and a non-blocking position, and means for selectively holding the stop member in the blocking position.

25. The card package production system of claim 24 in which said selectively holding means includes a brake for selectively holding the stop member movably mounting means against movement.

26. The card package production system of claim 24 in which said movably mounting means includes means for pivotally mounting the stop member to swing out of the way of a folding form being moved thereby when the stop member is not selectively held in the blocking position.

27. The card package production system of claim 21 in which said releasably holding means includes a stop member, and means for holding the stop member tilted backwards against the bifold carrier form movement along the folding path to hold the bifold carrier form from flipping over on edge.

* * * * *